(12) United States Patent
Ge et al.

(10) Patent No.: US 11,917,498 B2
(45) Date of Patent: Feb. 27, 2024

(54) COMMUNICATION METHOD AND COMMUNICATIONS APPARATUS

(71) Applicant: HUAWEI TECHNOLOGIES CO., LTD., Guangdong (CN)

(72) Inventors: Cuili Ge, Beijing (CN); Yanmei Yang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/132,423

(22) Filed: Dec. 23, 2020

(65) Prior Publication Data

US 2021/0112379 A1    Apr. 15, 2021

Related U.S. Application Data

(63) Continuation of application No. PCT/CN2019/093410, filed on Jun. 27, 2019.

(30) Foreign Application Priority Data

Jun. 28, 2018   (CN) .......................... 201810691796.8

(51) Int. Cl.
  *H04W 4/06*    (2009.01)
  *H04W 76/12*   (2018.01)
  (Continued)

(52) U.S. Cl.
  CPC .............. *H04W 4/06* (2013.01); *H04W 76/11* (2018.02); *H04W 76/12* (2018.02); *H04W 88/16* (2013.01)

(58) Field of Classification Search
  CPC . H04W 36/0007; H04W 4/06; H04W 72/005; H04W 76/11; H04W 76/12; H04W 76/40; H04W 88/16; H04W 92/24
  See application file for complete search history.

(56) References Cited

U.S. PATENT DOCUMENTS

| 9,338,715 B1* | 5/2016 | Sevindik ............... H04W 76/40 |
| 2008/0069071 A1* | 3/2008 | Tang ..................... H04W 72/30 |
| | | 370/342 |

(Continued)

FOREIGN PATENT DOCUMENTS

| CN | 101547189 A | 9/2009 |
| CN | 101547402 A | 9/2009 |

(Continued)

OTHER PUBLICATIONS

Huawei et al., "Solution to Support IPTV Service", SA WG2 Meeting #127, SA WG2 Meeting #127, Apr. 16-Apr. 20, 2018, Sanya, China, total 8 pages.

(Continued)

*Primary Examiner* — Saad A. Waqas
(74) *Attorney, Agent, or Firm* — WOMBLE BOND DICKINSON (US) LLP

(57) ABSTRACT

This application discloses a communication method and a communications apparatus, to resolve problems of a long transmission path and a large transmission delay of signaling that are caused because a data network (DN) to which application layer control signaling used to control path switching needs to be transmitted for processing in a process of the path switching is outside a mobile communications network. The method includes receiving, by a first core network device, a request message from a terminal, where the request message is used to request to switch from a multicast mode to a unicast mode to transmit service data to be sent to the terminal. The method further includes indicating, by the first core network device based on the request message, a multicast user plane gateway and/or a service server corresponding to the terminal to send, to the terminal in the unicast mode, the service data to be sent to the terminal.

13 Claims, 11 Drawing Sheets

(51) Int. Cl.
*H04W 76/11* (2018.01)
*H04W 88/16* (2009.01)

(56) References Cited

U.S. PATENT DOCUMENTS

| | | | | |
|---|---|---|---|---|
| 2009/0316615 | A1* | 12/2009 | Vedantham | H04L 65/611 370/312 |
| 2011/0134808 | A1 | 6/2011 | Thyni et al. | |
| 2013/0055301 | A1* | 2/2013 | Hao | H04H 20/57 725/14 |
| 2014/0192697 | A1* | 7/2014 | Anchan | H04W 4/06 370/312 |
| 2016/0127233 | A1 | 5/2016 | Wentink et al. | |
| 2017/0339609 | A1 | 11/2017 | Youn et al. | |
| 2021/0058748 | A1* | 2/2021 | Liao | H04W 76/11 |

FOREIGN PATENT DOCUMENTS

| | | | |
|---|---|---|---|
| CN | 102480686 A | 5/2012 | |
| CN | 103797873 A | 5/2014 | |
| CN | 103974198 A | 8/2014 | |
| CN | 104754522 A | 7/2015 | |
| CN | 104955086 A | 9/2015 | |
| CN | 106488409 A | 3/2017 | |
| JP | 2021072454 A * | 5/2021 | ........ H04W 28/0268 |
| WO | WO-2006110322 A2 * | 10/2006 | ....... H04L 29/06027 |
| WO | 2010061483 A1 | 6/2010 | |
| WO | 2015000315 A1 | 1/2015 | |

OTHER PUBLICATIONS

3GPP TS 29.244 V15.2.0 (Jun. 2018), 3rd Generation Partnership Project; Technical Specification Group Core Network and Terminals; Interface between the Control Plane and the User Plane Nodes; Stage 3(Release 15), 176 pages.

3GPP TS 23.501 V15.2.0 (Jun. 2018), 3rd Generation Partnership Project; Technical Specification Group Services and System Aspects; System Architecture for the 5G System; Stage 2(Release 15), 217 pages.

3GPP TS 23.401 V15.4.0 (Jun. 2018), 3rd Generation Partnership Project; Technical Specification Group Services and System Aspects; General Packet Radio Service (GPRS) enhancements for Evolved Universal Terrestrial Radio Access Network (E-UTRAN) access(Release 15), 410 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2019/093410, filed on Jun. 27, 2019, which claims priority to Chinese Patent Application No. 201810691796.8, filed on Jun. 28, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In some communications systems, both a multicast transmission path and a unicast transmission path are established by an application server that is in a data network (DN). When transmission quality of the multicast transmission path is poor, the application server may perform path switching by using an application layer interface and a protocol that are between the application server and an application client that is in a terminal, to be specific, switch, by using application layer control signaling, from the multicast transmission path to the unicast transmission path to transmit service data of the terminal.

In a process of performing the path switching according to the foregoing method, the application layer control signaling used to control the path switching needs to be transmitted to the DN for processing. Because the DN is located outside a mobile communications network, a transmission path of the application layer control signaling is long, and a transmission delay of the application layer control signaling is large.

SUMMARY

Embodiments of this application provide a communication method and a communications apparatus, to resolve problems of a long transmission path and a large transmission delay of signaling that are caused because a data network (DN) to which application layer control signaling used to control path switching needs to be transmitted for processing in a process of the path switching is outside a mobile communications network.

According to a first aspect, a communication method is provided, including: A first core network device receives a request message from a terminal, where the request message is used to request to switch from a multicast mode to a unicast mode to transmit service data to be sent to the terminal. The first core network device indicates, based on the request message, a multicast user plane gateway and/or a service server corresponding to the terminal to send, to the terminal in the unicast mode, the service data to be sent to the terminal. According to the method provided in the first aspect, after receiving the request message, the first core network device indicates the service server and/or the multicast user plane gateway to send the target data to the terminal in the unicast mode, so that the service server and/or the multicast user plane gateway can send the target data to the terminal in the unicast mode based on the indication. In this way, a core network device completes path switching, thereby avoiding problems of a long transmission path and a large transmission delay of signaling that are caused because a DN to which application layer control signaling needs to be transmitted for processing is outside a mobile communications network.

With reference to the first aspect, in a first possible embodiment, the method further includes: The first core network device sends information about a unicast user plane gateway corresponding to the terminal to the multicast user plane gateway and/or the service server. In the possible embodiment, the multicast user plane gateway and/or the service server can determine the unicast user plane gateway that sends the service data to be sent to the terminal, so that the multicast user plane gateway and/or the service server send/sends, to the terminal in the unicast mode, the service data to be sent to the terminal.

With reference to the first aspect, in a second possible embodiment, that the first core network device indicates, based on the request message, a multicast user plane gateway and/or a service server to send, to the terminal in the unicast mode, the service data to be sent to the terminal includes: The first core network device sends, based on the request message, information about a unicast user plane gateway corresponding to the terminal to the multicast user plane gateway and/or the service server. In the possible embodiment, the multicast user plane gateway and/or the service server can determine the unicast user plane gateway that sends the service data to be sent to the terminal, so that the multicast user plane gateway and/or the service server send/sends, to the terminal in the unicast mode, the service data to be sent to the terminal.

With reference to the first possible embodiment or the second possible embodiment of the first aspect, in a third possible embodiment, the method further includes: The first core network device obtains the information about the unicast user plane gateway based on the request message. In the possible embodiment, the first core network device can obtain the information about the unicast user plane gateway, to send the information about the unicast user plane gateway to the multicast user plane gateway and/or the service server.

With reference to the third possible embodiment of the first aspect, in a fourth possible embodiment, that the first core network device obtains the information about the unicast user plane gateway based on the request message includes: The first core network device requests the information about the unicast user plane gateway from a second core network device based on the request message. The first core network device receives the information about the unicast user plane gateway from the second core network device. In the possible embodiment, when a control plane session management network element managing a multicast transmission path and a control plane session management network element managing a unicast transmission path are different network elements, the first core network device can obtain the information about the unicast user plane gateway.

With reference to the fourth possible embodiment of the first aspect, in a fifth possible embodiment, the request message includes an identifier of a unicast transmission path corresponding to the terminal. In the possible embodiment, the second core network device may determine the unicast user plane gateway based on the identifier of the unicast transmission path.

With reference to the fourth possible embodiment or fifth possible embodiment of the first aspect, in a sixth possible embodiment, the request message includes an identifier of a multicast transmission path corresponding to the terminal, and the method further includes: The first core network device sends, to the second core network device, an identifier of a unicast transmission path corresponding to the terminal, and the identifier of the multicast transmission path corresponding to the terminal. Alternatively, the first core network device sends an identifier of a unicast transmission path corresponding to the terminal, and information about the multicast user plane gateway to the second core network device, where the information about the multicast user plane gateway is a tunnel identifier of the multicast user plane gateway, or the information about the multicast user plane gateway is a user plane address and a port number of the multicast user plane gateway. In the possible embodiment, the second core network device can obtain the identifier of the unicast transmission path and the identifier of the multicast transmission path, or the identifier of the unicast transmission path and the information about the multicast user plane gateway.

With reference to the third possible embodiment of the first aspect, in a seventh possible embodiment, that the first core network device obtains the information about the unicast user plane gateway based on the request message includes: The first core network device determines, based on the request message, a unicast transmission path corresponding to the terminal. The first core network device obtains the information about the unicast user plane gateway based on the unicast transmission path. In the possible embodiment, the first core network device can obtain the information about the unicast user plane gateway, to send the information about the unicast user plane gateway to the multicast user plane gateway and/or the service server.

With reference to the seventh possible embodiment of the first aspect, in an eighth possible embodiment, that the first core network device determines, based on the request message, a unicast transmission path corresponding to the terminal includes: When the request message includes an identifier of the terminal, the first core network device determines one quality of service (QoS) flow in at least one QoS flow corresponding to the identifier of the terminal as the unicast transmission path. Alternatively, when the request message includes an identifier of a packet data unit (PDU) session of the terminal, the first core network device determines one QoS flow in at least one QoS flow corresponding to the identifier of the PDU session of the terminal as the unicast transmission path. Alternatively, when the request message includes an identifier of a QoS flow, the first core network device determines the QoS flow corresponding to the identifier of the QoS flow as the unicast transmission path. In the possible embodiment, the first core network device can determine the unicast transmission path to be switched to.

With reference to the seventh possible embodiment or the eighth possible embodiment of the first aspect, in a ninth possible embodiment, the method further includes: The first core network device indicates the unicast user plane gateway to send, to the terminal on the unicast transmission path, the received service data to be sent to the terminal. In the possible embodiment, the unicast user plane gateway is indicated to send, to the terminal on the unicast transmission path, the received service data to be sent to the terminal, to implement path switching.

With reference to the ninth possible embodiment of the first aspect, in a tenth possible embodiment, the request message includes an identifier of a multicast transmission path corresponding to the terminal, and that the first core network device indicates the unicast user plane gateway to send, to the terminal on the unicast transmission path, the received service data to be sent to the terminal includes: The first core network device sends an identifier of the unicast transmission path and the identifier of the multicast transmission path to the unicast user plane gateway. Alternatively, the first core network device sends an identifier of the unicast transmission path and information about the multicast user plane gateway to the unicast user plane gateway, where the information about the multicast user plane gateway is a tunnel identifier of the multicast user plane gateway, or the information about the multicast user plane gateway is a user plane address and a port number of the multicast user plane gateway. In the possible embodiment, the unicast user plane gateway can obtain the identifier of the unicast transmission path and the identifier of the multicast transmission path, or the identifier of the unicast transmission path and the information about the multicast user plane gateway. Therefore, the unicast user plane gateway sends, to the terminal on the unicast transmission path, the service data to be sent to the terminal, where the service data to be sent to the terminal is originally sent on the multicast transmission path corresponding to the terminal, and switching is performed from the multicast transmission path corresponding to the terminal to the unicast transmission path corresponding to the terminal, to implement the path switching.

With reference to any one of the sixth possible embodiment to the tenth possible embodiment of the first aspect, in an eleventh possible embodiment, the method further includes: The first core network device sends a response message of the request message to the terminal, where the response message includes the identifier of the unicast transmission path. In the possible embodiment, the terminal can determine the unicast transmission path for receiving the service data to be sent to the terminal, so that the terminal can correctly receive the service data.

According to a second aspect, a communication method is provided, including: A second core network device receives a request message from a first core network device, where the request message is used to request information about a unicast user plane gateway corresponding to a terminal. The second core network device sends the information about the unicast user plane gateway to the first core network device based on the request message. According to the method provided in the second aspect, the second core network device may send the information about the unicast user plane gateway to the first core network device based on the request message, so that the first core network device determines the unicast user plane gateway.

With reference to the second aspect, in a first possible embodiment, the request message includes an identifier of a unicast transmission path corresponding to the terminal, and the method further includes: The second core network device indicates the unicast user plane gateway to send, to the terminal on the unicast transmission path, received service data to be sent to the terminal, where the received service data to be sent to the terminal is originally sent on a multicast transmission path corresponding to the terminal, and switching is performed from the multicast transmission path corresponding to the terminal to the unicast transmission path. In the possible embodiment, the unicast user plane gateway is indicated to send, to the terminal on the unicast transmission path, the received service data to be sent to the terminal, to implement path switching.

With reference to the first possible embodiment of the second aspect, in a second possible embodiment, the request message further includes an identifier of the multicast transmission path, and the method further includes: The second core network device sends the identifier of the unicast transmission path and the identifier of the multicast transmission path to the unicast user plane gateway. In the possible embodiment, the unicast user plane gateway can obtain the identifier of the unicast transmission path and the identifier of the multicast transmission path. Therefore, the unicast user plane gateway sends, to the terminal on the unicast transmission path, the service data to be sent to the terminal, where the service data to be sent to the terminal is originally sent on the multicast transmission path corresponding to the terminal, and switching is performed from the multicast transmission path corresponding to the terminal to the unicast transmission path corresponding to the terminal, to implement the path switching.

With reference to the first possible embodiment of the second aspect, in a third possible embodiment, the request message further includes information about a multicast user plane gateway corresponding to the terminal, where the information about the multicast user plane gateway is a tunnel identifier of the multicast user plane gateway, or the information about the multicast user plane gateway is a user plane address and a port number of the multicast user plane gateway; and the communication method further includes: The second core network device sends the identifier of the unicast transmission path and the information about the multicast user plane gateway to the unicast user plane gateway. In the possible embodiment, the unicast user plane gateway can obtain the identifier of the unicast transmission path and the information about the multicast user plane gateway. Therefore, the unicast user plane gateway sends, to the terminal on the unicast transmission path, the service data to be sent to the terminal, where the service data to be sent to the terminal is originally sent on the multicast transmission path corresponding to the terminal, and switching is performed from the multicast transmission path corresponding to the terminal to the unicast transmission path corresponding to the terminal, to implement the path switching.

With reference to the second aspect, in a fourth possible embodiment, the method further includes: The second core network device receives, the identifier of the unicast transmission path and an identifier of the multicast transmission path from the first core network device, and sends the identifier of the unicast transmission path and the identifier of the multicast transmission path to the unicast user plane gateway. Alternatively, the second core network device receives, from the first core network device, the identifier of the unicast transmission path and information about a multicast user plane gateway corresponding to the terminal, and sends the identifier of the unicast transmission path and the information about the multicast user plane gateway to the unicast user plane gateway, where the information about the multicast user plane gateway is a tunnel identifier of the multicast user plane gateway, or the information about the multicast user plane gateway is a user plane address and a port number of the multicast user plane gateway. In the possible embodiment, the unicast user plane gateway can obtain the identifier of the unicast transmission path and the identifier of the multicast transmission path, or the identifier of the unicast transmission path and the information about the multicast user plane gateway. Therefore, the unicast user plane gateway sends, to the terminal on the unicast transmission path, service data to be sent to the terminal, where the service data to be sent to the terminal is originally sent on the multicast transmission path corresponding to the terminal, and switching is performed from the multicast transmission path corresponding to the terminal to the unicast transmission path corresponding to the terminal, to implement path switching.

According to a third aspect, a communication method is provided, including: A terminal sends a request message to a first core network device, where the request message is used to request to switch from a multicast mode to a unicast mode to transmit service data to be sent to the terminal. The terminal receives a response message of the request message from the first core network device. According to the method provided in the third aspect, the terminal may send the request message to the first core network device, so that the first core network device switches from the multicast mode to the unicast mode to transmit the service data to be sent to the terminal, thereby avoiding problems of a long transmission path and a large transmission delay of signaling that are caused because a DN to which application layer control signaling needs to be transmitted for processing is outside a mobile communications network.

With reference to the third aspect, in a first possible embodiment, the request message includes an identifier of a multicast transmission path corresponding to the terminal. In the possible embodiment, the first core network device can determine the to-be-switched multicast transmission path.

With reference to the third aspect or the first possible embodiment of the third aspect, in a second possible embodiment, the request message further includes an identifier of the terminal, an identifier of a PDU session of the terminal, or an identifier of a QoS flow of the terminal. In the possible embodiment, the identifier of the terminal, the identifier of the PDU session of the terminal, or the identifier of the QoS flow of the terminal that is included in the request message may be used by the first core network device to determine a unicast transmission path corresponding to the terminal.

With reference to the third aspect, the first possible embodiment, or the second possible embodiment of the third aspect, in a third possible embodiment, the response message includes an identifier of a unicast transmission path corresponding to the terminal. In the possible embodiment, the terminal can determine the unicast transmission path for receiving the service data to be sent to the terminal, to correctly receive the service data.

According to a fourth aspect, a communication method is provided, including: A unicast user plane gateway receives an indication used to indicate to send, to a terminal on a unicast transmission path, service data to be sent to the terminal, where the service data to be sent to the terminal is originally sent on a multicast transmission path corresponding to the terminal, and switching is performed from the multicast transmission path corresponding to the terminal to the unicast transmission path corresponding to the terminal. A unicast user plane gateway receives the service data to be sent to the terminal. The unicast user plane gateway sends, to the terminal based on the indication on the unicast transmission path, the service data to be sent to the terminal. According to the method provided in the fourth aspect, the unicast user plane gateway may receive the indication, and send, to the terminal based on the indication on the unicast transmission path, the service data to be sent to the terminal, where the service data to be sent to the terminal is originally sent on the multicast transmission path corresponding to the terminal, and switching is performed from the multicast transmission path corresponding to the terminal to the unicast transmission path corresponding to the terminal, to implement path switching.

With reference to the fourth aspect, in a first possible embodiment, the method further includes: The unicast user plane gateway receives an identifier of the unicast transmission path and an identifier of the multicast transmission path. Alternatively, the unicast user plane gateway receives an identifier of the unicast transmission path and information about a multicast user plane gateway, where the information about the multicast user plane gateway is a tunnel identifier of the multicast user plane gateway, or the information about the multicast user plane gateway is a user plane address and a port number of the multicast user plane gateway. In the possible embodiment, the unicast user plane gateway can determine the identifier of the unicast transmission path and the identifier of the multicast transmission path, or the identifier of the unicast transmission path and the information about the multicast user plane gateway.

With reference to the first possible embodiment of the fourth aspect, in a second possible embodiment, the method further includes: The unicast user plane gateway determines the unicast transmission path based on the identifier of the unicast transmission path. In the possible embodiment, the unicast user plane gateway can determine the unicast transmission path.

With reference to the first possible embodiment or the second possible embodiment of the fourth aspect, in a third possible embodiment, the method further includes: The unicast user plane gateway determines, based on the identifier of the multicast transmission path or the information about the multicast user plane gateway, the service data to be sent to the terminal. In the possible embodiment, the unicast user plane gateway can determine the service data to be sent to the terminal.

According to a fifth aspect, a communication method is provided, including: A multicast user plane gateway receives indication information from a first core network device, where the indication information is used to indicate to send, to a terminal in a unicast mode, service data to be sent to the terminal, where the service data to be sent to the terminal is originally sent on a multicast transmission path corresponding to the terminal, and switching is performed from the multicast transmission path corresponding to the terminal to a unicast transmission path corresponding to the terminal. The multicast user plane gateway sends, based on the indication information to a unicast user plane gateway corresponding to the terminal, the service data that is received from a service server and that is to be sent to the terminal. According to the method provided in the fifth aspect, the multicast user plane gateway may send, in the unicast mode based on the received indication information, the service data to be sent to the terminal, where the service data to be sent to the terminal is originally sent on the multicast transmission path corresponding to the terminal, and switching is performed from the multicast transmission path corresponding to the terminal to the unicast transmission path corresponding to the terminal, to implement path switching.

With reference to the fifth aspect, in a first possible embodiment, the method further includes: The multicast user plane gateway receives information about the unicast user plane gateway from the first core network device. In the possible embodiment, the multicast user plane gateway may determine the unicast user plane gateway by receiving the information about the unicast user plane gateway. With reference to the first possible embodiment of the fifth aspect, in a second possible embodiment, the method further includes: The multicast user plane gateway determines the unicast user plane gateway based on the information about the unicast user plane gateway. In the possible embodiment, the multicast user plane gateway may determine the unicast user plane gateway, to send, to the unicast user plane gateway, the service data to be sent to the terminal.

According to a sixth aspect, a communication method is provided, including: A service server receives indication information from a first core network device, where the indication information is used to indicate to send, to a terminal in a unicast mode, service data to be sent to the terminal, where the service data to be sent to the terminal is originally sent on a multicast transmission path corresponding to the terminal, and switching is performed from the multicast transmission path corresponding to the terminal to a unicast transmission path corresponding to the terminal. The service server sends, based on the indication information, the service data to be sent to the terminal to a unicast user plane gateway corresponding to the terminal. According to the method provided in the sixth aspect, the service server may send, in the unicast mode based on the received indication information, the service data to be sent to the terminal, where the service data to be sent to the terminal is originally sent on the multicast transmission path corresponding to the terminal, and switching is performed from the multicast transmission path corresponding to the terminal to the unicast transmission path corresponding to the terminal, to implement path switching.

With reference to the sixth aspect, in a first possible embodiment, the method further includes: The service server receives information about the unicast user plane gateway from the first core network device. In the possible embodiment, the service server may determine the unicast user plane gateway by receiving the information about the unicast user plane gateway.

With reference to the first possible embodiment of the sixth aspect, in a second possible embodiment, the method further includes: The service server determines the unicast user plane gateway based on the information about the unicast user plane gateway. In the possible embodiment, the service server may determine the unicast user plane gateway, to send, to the unicast user plane gateway, the service data to be sent to the terminal.

According to a seventh aspect, a communications apparatus is provided, including a communications unit and a processing unit. The communications unit is configured to receive a request message from a terminal, where the request message is used to request to switch from a multicast mode to a unicast mode to transmit service data to be sent to the terminal. The processing unit is configured to indicate, based on the request message, a multicast user plane gateway and/or a service server corresponding to the terminal to send, to the terminal in the unicast mode, the service data to be sent to the terminal.

With reference to the seventh aspect, in a first possible embodiment, the communications unit is further configured to send information about a unicast user plane gateway corresponding to the terminal to the multicast user plane gateway and/or the service server.

With reference to the seventh aspect, in a second possible embodiment, the processing unit is specifically configured to send, based on the request message via the communications unit, information about a unicast user plane gateway corresponding to the terminal to the multicast user plane gateway and/or the service server.

With reference to the first possible embodiment or the second possible embodiment of the seventh aspect, in a third possible embodiment, the processing unit is further configured to obtain the information about the unicast user plane gateway based on the request message.

With reference to the third possible embodiment of the seventh aspect, in a fourth possible embodiment, the processing unit is specifically configured to: request the information about the unicast user plane gateway from a second core network device based on the request message via the communications unit, and receive the information about the unicast user plane gateway from the second core network device.

With reference to the fourth possible embodiment of the seventh aspect, in a fifth possible embodiment, the request message includes an identifier of a unicast transmission path corresponding to the terminal.

With reference to the fourth possible embodiment or the fifth possible embodiment of the seventh aspect, in a sixth possible embodiment, the request message includes an identifier of a multicast transmission path corresponding to the terminal. The communications unit is further configured to send, to the second core network device, the identifier of the unicast transmission path corresponding to the terminal, and the identifier of the multicast transmission path corresponding to the terminal. Alternatively, the communications unit is further configured to send the identifier of the unicast transmission path corresponding to the terminal, and information about the multicast user plane gateway to the second core network device, where the information about the multicast user plane gateway is a tunnel identifier of the multicast user plane gateway, or the information about the multicast user plane gateway is a user plane address and a port number of the multicast user plane gateway.

With reference to the third possible embodiment of the seventh aspect, in a seventh possible embodiment, the processing unit is specifically configured to: determine, based on the request message, a unicast transmission path corresponding to the terminal, and obtain the information about the unicast user plane gateway based on the unicast transmission path.

With reference to the seventh possible embodiment of the seventh aspect, in an eighth possible embodiment, the processing unit is specifically configured to: when the request message includes an identifier of the terminal, determine one QoS flow in at least one QoS flow corresponding to the identifier of the terminal as the unicast transmission path; when the request message includes an identifier of a PDU session of the terminal, determine one QoS flow in at least one QoS flow corresponding to the identifier of the PDU session of the terminal as the unicast transmission path; or when the request message includes an identifier of a QoS flow, determine the QoS flow corresponding to the identifier of the QoS flow as the unicast transmission path.

With reference to the seventh possible embodiment or the eighth possible embodiment of the seventh aspect, in a ninth possible embodiment, the processing unit is further configured to indicate the unicast user plane gateway to send, to the terminal on the unicast transmission path, the received service data to be sent to the terminal.

With reference to the ninth possible embodiment of the seventh aspect, in a tenth possible embodiment, the request message includes an identifier of a multicast transmission path corresponding to the terminal, and the processing unit is specifically configured to: send an identifier of the unicast transmission path and the identifier of the multicast transmission path to the unicast user plane gateway via the communications unit, or send an identifier of the unicast transmission path and information about the multicast user plane gateway to the unicast user plane gateway via the communications unit, where the information about the multicast user plane gateway is a tunnel identifier of the multicast user plane gateway, or the information about the multicast user plane gateway is a user plane address and a port number of the multicast user plane gateway.

With reference to any one of the sixth possible embodiment to the tenth possible embodiment of the seventh aspect, in an eleventh possible embodiment, the communications unit is further configured to send a response message of the request message to the terminal, where the response message includes the identifier of the unicast transmission path.

According to an eighth aspect, a communications apparatus is provided, including a communications unit and a processing unit. The communications unit is configured to receive a request message from a first core network device, where the request message is used to request information about a unicast user plane gateway corresponding to a terminal. The processing unit is configured to send the information about the unicast user plane gateway to the first core network device based on the request message via the communications unit.

With reference to the eighth aspect, in a first possible embodiment, the request message includes an identifier of a unicast transmission path corresponding to the terminal, and the processing unit is further configured to indicate the unicast user plane gateway to send, to the terminal on the unicast transmission path, received service data to be sent to the terminal, where the service data to be sent to the terminal is originally sent on a multicast transmission path corresponding to the terminal, and switching is performed from the multicast transmission path corresponding to the terminal to the unicast transmission.

With reference to the first possible embodiment of the eighth aspect, in a second possible embodiment, the request message further includes an identifier of the multicast transmission path, and the communications unit is further configured to send the identifier of the unicast transmission path and the identifier of the multicast transmission path to the unicast user plane gateway.

With reference to the first possible embodiment of the eighth aspect, in a third possible embodiment, the request message further includes information about a multicast user plane gateway corresponding to the terminal, where the information about the multicast user plane gateway is a tunnel identifier of the multicast user plane gateway, or the information about the multicast user plane gateway is a user plane address and a port number of the multicast user plane gateway; and the communications unit is further configured to send the identifier of the unicast transmission path and the information about the multicast user plane gateway to the unicast user plane gateway.

With reference to the eighth aspect, in a fourth possible embodiment, the communications unit is further configured to: receive an identifier of a unicast transmission path and an identifier of a multicast transmission path from the first core network device, and send the identifier of the unicast transmission path and the identifier of the multicast transmission path to the unicast user plane gateway. Alternatively, the communications unit is further configured to: receive, from the first core network device, an identifier of a unicast transmission path and information about a multicast user plane gateway corresponding to the terminal, and send the identifier of the unicast transmission path and the information about the multicast user plane gateway to the unicast user plane gateway, where the information about the multicast user plane gateway is a tunnel identifier of the multicast user plane gateway, or the information about the multicast user plane gateway is a user plane address and a port number of the multicast user plane gateway.

According to a ninth aspect, a communications apparatus is provided, including a communications unit and a processing unit. The processing unit is configured to send a request message to a first core network device via a communications unit, where the request message is used to request to switch from a multicast mode to a unicast mode to transmit service data to be sent to a terminal. The processing unit is further configured to receive a response message of the request message from the first core network device via the communications unit.

With reference to the ninth aspect, in a first possible embodiment, the request message includes an identifier of a multicast transmission path corresponding to the terminal.

With reference to the ninth aspect or the first possible embodiment of the ninth aspect, in a second possible embodiment, the request message further includes an identifier of the terminal, an identifier of a PDU session of the terminal, or an identifier of a QoS flow of the terminal.

With reference to the ninth aspect, the first possible embodiment, or the second possible embodiment of the ninth aspect, in a third possible embodiment, the response message includes an identifier of a unicast transmission path corresponding to the terminal.

According to a tenth aspect, a communications apparatus is provided, including a communications unit and a processing unit. The communications unit is configured to receive an indication used to indicate to send, to a terminal on a unicast transmission path, service data to be sent to the terminal, where the service data to be sent to the terminal is originally sent on a multicast transmission path corresponding to the terminal, and switching is performed from the multicast transmission path corresponding to the terminal to the unicast transmission path corresponding to the terminal. The communications unit is further configured to receive the service data to be sent to the terminal. The processing unit is configured to send, to the terminal based on the indication on the unicast transmission path via the communications unit, the service data to be sent to the terminal.

With reference to the tenth aspect, in a first possible embodiment, the communications unit is further configured to receive an identifier of the unicast transmission path and an identifier of the multicast transmission path. Alternatively, the communications unit is further configured to receive the identifier of the unicast transmission path and information about the multicast user plane gateway, where the information about the multicast user plane gateway is a tunnel identifier of the multicast user plane gateway, or the information about the multicast user plane gateway is a user plane address and a port number of the multicast user plane gateway.

With reference to the first possible embodiment of the tenth aspect, in a second possible embodiment, the processing unit is further configured to determine the unicast transmission path based on the identifier of the unicast transmission path.

With reference to the first possible embodiment or the second possible embodiment of the tenth aspect, in a third possible embodiment, the processing unit is further configured to determine, based on the identifier of the multicast transmission path or the information about the multicast user plane gateway, the service data to be sent to the terminal.

According to an eleventh aspect, a communications apparatus is provided, including a communications unit and a processing unit. The communications unit is configured to receive indication information from a first core network device, where the indication information is used to indicate to send, to a terminal in a unicast mode, service data to be sent to the terminal, where the service data to be sent to the terminal is originally sent on a multicast transmission path corresponding to the terminal, and switching is performed from the multicast transmission path corresponding to the terminal to a unicast transmission path corresponding to the terminal. The processing unit is configured to send, based on the indication information via the communications unit to a unicast user plane gateway corresponding to the terminal, the service data that is received from a service server and that is to be sent to the terminal.

With reference to the eleventh aspect, in a first possible embodiment, the communications unit is further configured to receive information about the unicast user plane gateway from the first core network device.

With reference to the first possible embodiment of the eleventh aspect, in a second possible embodiment, the processing unit is further configured to determine the unicast user plane gateway based on the information about the unicast user plane gateway.

According to a twelfth aspect, a communications apparatus is provided, including a communications unit and a processing unit. The communications unit is configured to receive indication information from a first core network device, where the indication information is used to indicate to send, to a terminal in a unicast mode, service data to be sent to the terminal, where the service data to be sent to the terminal is originally sent on a multicast transmission path corresponding to the terminal, and switching is performed from the multicast transmission path corresponding to the terminal to a unicast transmission path corresponding to the terminal. The processing unit is configured to send, based on the indication information via the communications unit to a unicast user plane gateway corresponding to the terminal, the service data to be sent to the terminal.

With reference to the twelfth aspect, in a first possible embodiment, the communications unit is further configured to receive information about the unicast user plane gateway from the first core network device.

With reference to the first possible embodiment of the twelfth aspect, in a second possible embodiment, the processing unit is further configured to determine the unicast user plane gateway based on the information about the unicast user plane gateway.

According to a thirteenth aspect, a communications apparatus is provided. The apparatus includes a memory, a processor, at least one communications interface, and a communications bus. The memory is configured to store a computer-executable instruction. The processor, the memory, and the at least one communications interface are connected via the communications bus. The processor executes the computer-executable instruction stored in the memory, so that the apparatus performs a corresponding method. The apparatus may be the foregoing first core network device, second core network device, unicast user plane gateway, multicast user plane gateway, terminal, or service server. When the apparatus is the first core network device, the method corresponding to the apparatus is any method provided in the first aspect. When the apparatus is the second core network device, the method corresponding to the apparatus is any method provided in the second aspect. When the apparatus is the terminal, the method corresponding to the apparatus is any method provided in the third aspect. When the apparatus is the unicast user plane gateway, the method corresponding to the apparatus is any method provided in the fourth aspect. When the apparatus is the multicast user plane gateway, the method corresponding to the apparatus is any method provided in the fifth aspect. When the apparatus is the service server, the method corresponding to the apparatus is any method provided in the sixth aspect. The apparatus may exist in a product form of a chip.

According to a fourteenth aspect, a computer-readable storage medium is provided. The computer-readable storage medium includes an instruction, and when the instruction is run on a computer, the computer is enabled to perform any method according to any one of the first aspect to the sixth aspect.

According to a fifteenth aspect, a computer program product including an instruction is provided, and when the computer program product runs on a computer, the computer is enabled to perform any method according to any one of the first aspect to the sixth aspect.

For technical effects brought by any design manner in the seventh aspect to the fifteenth aspect, refer to technical effects brought by different design manners in the first aspect to the sixth aspect. Details are not described herein again.

DESCRIPTION OF EMBODIMENTS

The following describes the technical solutions in embodiments of this application with reference to accompanying drawings in the embodiments of this application. In the description of this application, unless otherwise specified, "/" means "or". For example, AB may represent A or B. The term "and/or" in this specification describes only an association relationship for associated objects and represents that three relationships may exist. For example, A and/or B may represent the following three cases: Only A exists, both A and B exist, and only B exists. In the description of the embodiments of this application, for " . . . send C to A and/or B, A and/or B receive/receives C, and A and/or B perform/performs . . . based on C", it may be understood that, when " . . . send C to A", "A receives C, and A performs . . . based on C"; when " . . . sends C to B", "B receives C, and B performs . . . based on C"; when " . . . sends C to A and B", "A and B receive C, and A and B perform . . . based on C".

In addition, "a plurality of" means two or more than two. Words such as "first" and "second" do not limit a quantity and an execution sequence, and the words such as "first" and "second" do not indicate a definite difference.

It should be noted that the technical solutions in the embodiments of this application may be applied to various communications systems, for example, a global system for mobile communications (GSM), evolved universal terrestrial radio access (E-UTRA), a universal mobile telecommunications system (UMTS) and an evolved version of UMTS, long term evolution (LTE) and various versions evolved based on LTE, and a next-generation communications system such as a 5th generation (5G) communications system or a new radio (NR) system.

Figure 1:
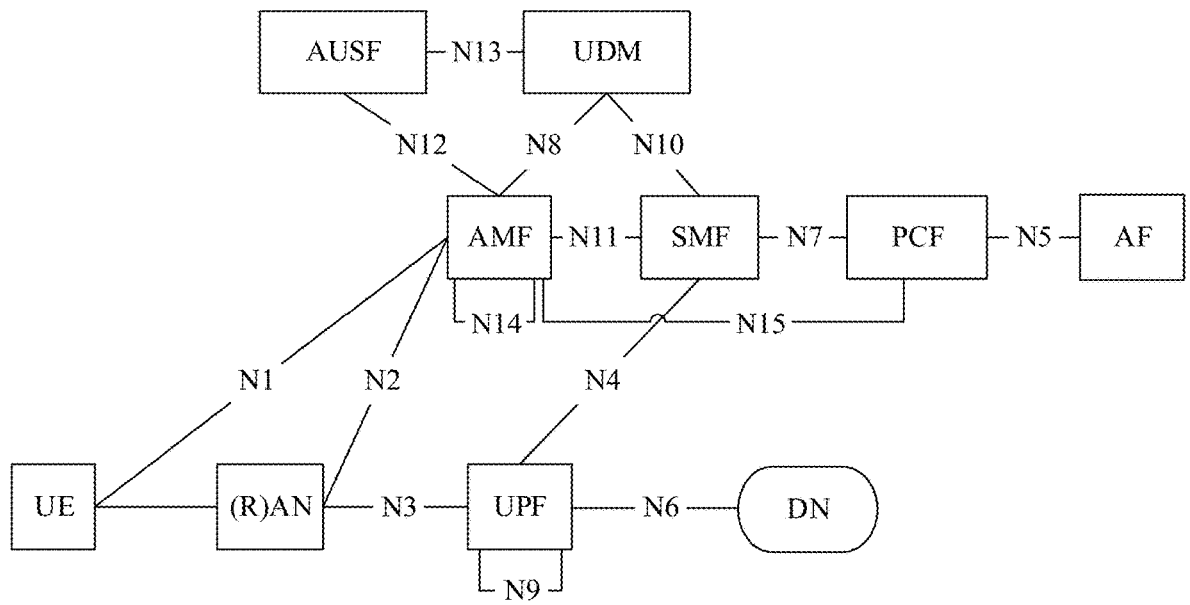
FIG. 1 is a schematic diagram of an architecture of a fifth generation (5G) network according to an embodiment of this application.

FIG. 1 is an example of a schematic diagram of a network architecture of a 5G network. In the schematic diagram, the 5G network may include the following network function (NF) entities: an authentication server function (AUSF) entity, an access and mobility management function (AMF) entity, a DN, a unified data management (UDM) entity, a policy control function (PCF) entity, a (radio) access network ((R)AN) entity, a user plane function (UPF) entity, user equipment (UE), an application function (AF) entity, a session management function (SMF) entity, and the like.

The UE may be referred to as a terminal, and the terminal may be a wireless terminal or a wired terminal. The wireless terminal may refer to a device that provides a user with voice and/or data connectivity, a handheld device with a wireless connection function, or another processing device connected to a wireless modem. The wireless terminal may communicate with one or more core network devices via the AN/RAN, for example, communicate with an AMF, an SMF, and the like. The wireless terminal may be a mobile terminal, for example, a mobile phone (or referred to as a "cellular" phone), a smartphone, a satellite wireless device, a wireless modem card, or a computer with a mobile terminal. For example, the computer with the mobile terminal may be a laptop, a portable, a pocket-sized, a handheld, a computer built-in, or an in-vehicle mobile apparatus that exchanges voice and/or data with the RAN. For example, the wireless terminal may be a device such as a personal communication service (PCS) telephone, a cordless telephone set, a session initiation protocol (SIP) telephone set, a wireless local loop (WLL) station, or a personal digital assistant (PDA). The wireless terminal may also be referred to as a subscriber unit, a subscriber station, a mobile station, a mobile, a remote station, an access point, a remote terminal, an access terminal, a user terminal, or a user agent. In addition, the terminal may also be a relay.

The PCF has functions such as providing a policy rule for a control plane functional entity.

The UDM provides functions such as managing subscription data of a user and generating authentication information of the user.

The AF may be an application server that may belong to an operator or a third party.

The (R)AN is a network including a plurality of 5G-RAN nodes, and implements a radio physical layer function, resource scheduling and radio resource management, radio access control, and a mobility management function. The 5G-RAN node is connected to the UPF through a user plane interface N3, and is configured to transmit data of the terminal. The 5G-RAN node establishes a control plane signaling connection to the AMF through a control plane interface N2, to implement functions such as radio access bearer control.

The AMF is mainly responsible for functions such as registration management of the terminal, connection management of the terminal, reachability management of the terminal, access authorization and access authentication of the terminal, a security function of the terminal, mobility management of the terminal, network slice selection, and SMF selection. The AMF serves as an anchor for N1 and N2 signaling connections, provides the SMF with routing of a session management (SM) message through an N1/N2 interface, and maintains and manages status information of the terminal.

The SMF is mainly responsible for all control plane functions in terminal session management. The control plane functions include UPF selection and control, internet interconnection agreement (IP) address assignment and management, quality of service (QoS) management of a session, obtaining a policy and charging control (PCC) policy from the PCF, and the like. The SMF is also used as a termination of an SM part that is in a non-access stratum (NAS) message.

The UPF is used as an anchor point of a packet data unit (PDU) session connection, and is responsible for data packet filtering, data transmission/forwarding, rate control, charging information generation, user plane QoS processing, uplink transmission authentication, transmission grade verification, downlink data packet buffering, and downlink data notification triggering of the terminal. The UPF may also be used as a branch point of a multi-homed PDU session.

It may be understood that, in addition to the functional entities shown in FIG. 1, the network architecture of the 5G network may further include another functional entity. For example, a network exposure function (NEF) entity may be further included between the AF entity and the PCF entity, and may be configured to exchange information inside and outside a network, and the like. In this embodiment of this application, an entity may also be referred to as a network element, a device, or the like.

It should be noted that the (R)AN entity, the AMF entity, the SMF entity, the AUSF entity, the UDM entity, the UPF entity, the PCF entity, and the like in FIG. 1 are merely names, and the names constitute no limitation on the entities. In the 5G network and other future networks, network elements or devices corresponding to these entities may also have other names. This is not specifically limited in this embodiment of this application. For example, the UDM entity may be probably replaced with a home subscriber server (HSS), a user subscription database (USD), or a database entity. Unified descriptions are provided herein, and details are not described below again.

In addition, the UDM entity, the AUSF entity, the PCF entity, the AMF entity, and the SMF entity in FIG. 1 may also be collectively referred to as the control plane function (CPF) entity. This is not specifically limited in this embodiment of this application. For ease of description, the (R)AN entity, the AMF entity, the SMF entity, the UDM entity, the UPF entity, the PCF entity, and the CPF entity are referred to as an (R)AN, an AMF, an SMF, a UDM, a UPF, a PCF, and a CPF below, respectively.

The method provided in the embodiments of this application may be further applied to a network slice. Network slicing technology divides a physical network into a plurality of virtual end-to-end networks. Each virtual network includes a device, an access technology, a transmission path, and a core network in the network, which are logically independent. Network slices each include a separate network function or are obtained by instantiating a combination of functions, have different function features, and are oriented towards different requirements and services. The network slices are isolated so that different users or user groups can flexibly and dynamically define and customize network capabilities based on different application scenarios and requirements of the users or user groups, without affecting each other. Using the 5G network as an example, one network slice may include the CPF and the UPF. The CPF mainly completes access control and mobility management functions such as access authentication, security encryption, and location registration of the terminal, and session management functions such as establishment, release, and change of a user plane transmission path. The UPF mainly completes functions such as routing and forwarding of user plane data.

Figure 2:
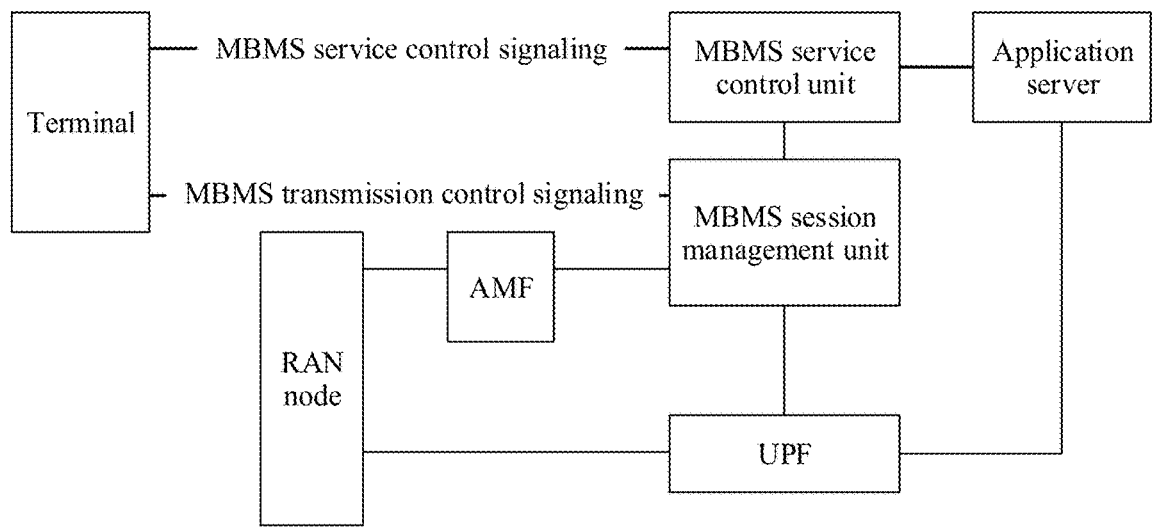
FIG. 2 to FIG. 4 each are a schematic composition diagram of a multimedia broadcast/multicast service (MBMS) data transmission system according to an embodiment of this application.
Figure 3:
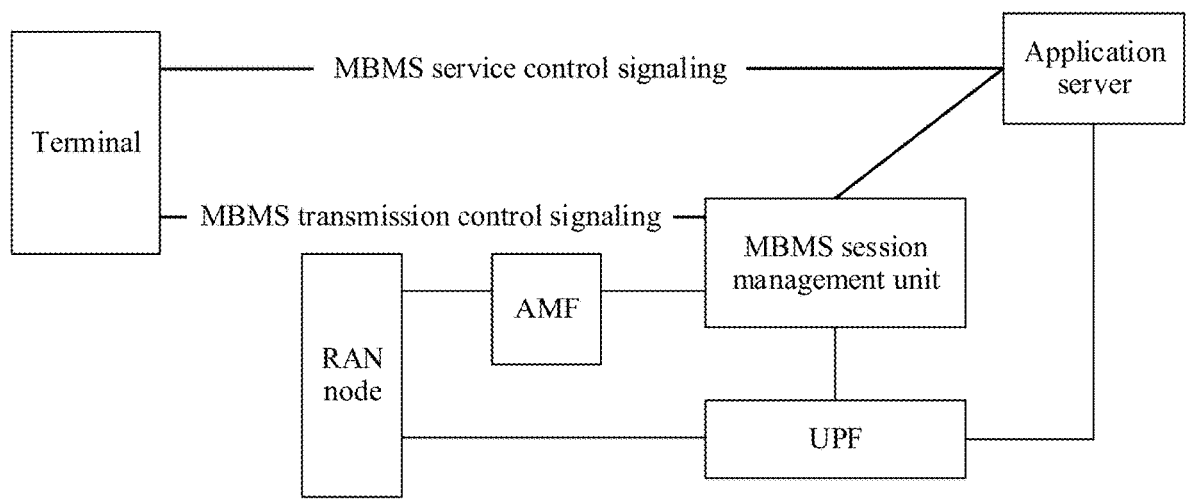
Figure 4:
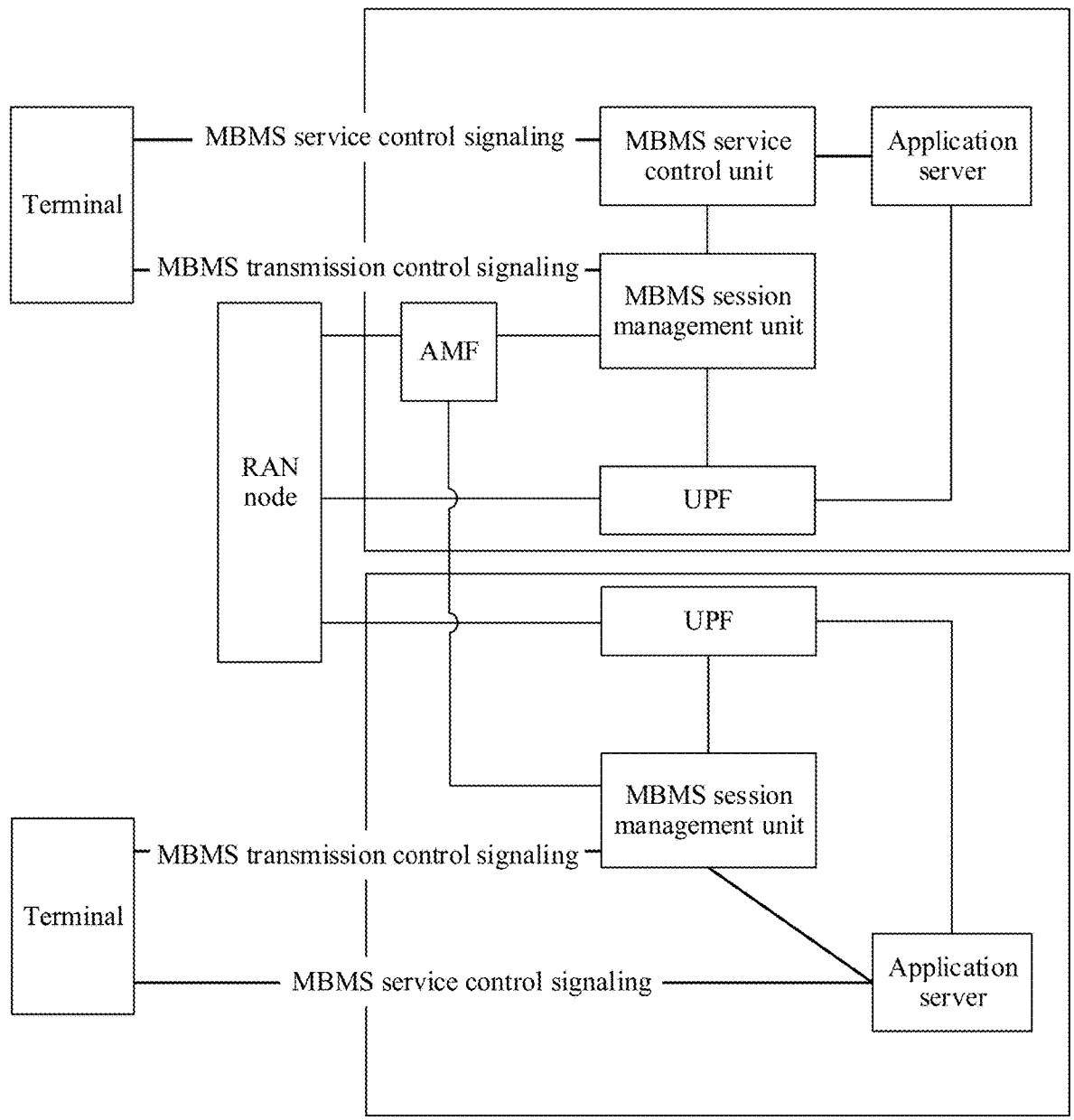

The method provided in this embodiment of this application may be further applied to a 3GPP multimedia broadcast/multicast service (multimedia broadcast/multicast service) data transmission system. Reference may be made to FIG. 2, FIG. 3, and FIG. 4. FIG. 2, FIG. 3, and FIG. 4 each are a schematic architectural diagram of a 3GPP MBMS data transmission system that is based on a 5G network.

An architecture shown in FIG. 2 includes an application server, an MBMS service control unit, an MBMS session management unit, a UPF, an AMF, a terminal, and a RAN node. Service data sent by the application server may be multicast to a plurality of terminals by using the UPF and the RAN node.

An architecture shown in FIG. 3 includes an application server, an MBMS session management unit, a UPF, an AMF, a terminal, and a RAN node. Service data sent by the application server may be multicast to a plurality of terminals by using the UPF and the RAN node.

FIG. 4 shows a combination of the two architectures shown in FIG. 2 and FIG. 3.

The following describes the network elements involved in FIG. 2 to FIG. 4.

The MBMS session management unit is mainly responsible for allocating an identifier of a multicast transmission path, establishing the multicast transmission path, managing dynamic multicast/multicast single frequency network (MBSFN) area configuration, sending information about the multicast transmission path to the MBMS service control unit, and the like. The MBMS session management unit may be a logical network element, for example, may be an enhancement of an SMF in an existing 5G architecture (that is, functions of the MBMS session management unit are integrated into the SMF), or may be an independent physical network element. The MBMS session management unit may also be referred to as an MBMS transmission control unit, a group session management network element, or the like.

The MBMS service control unit is mainly responsible for determining a transmission mode (unicast or multicast) of a service based on information such as a service requirement and user distribution, sending service control information and media data to the MBMS session management unit, managing service authorization of a user, managing group members, and delivering information about a multicast transmission path corresponding to the service to the user. The MBMS service control unit may be a logical network element, or may be an independent physical network element.

It should be noted that the MBMS service control unit and the MBMS session management unit may be deployed in one physical device.

The AMF is responsible for forwarding control signaling between the MBMS session management unit and the RAN node.

The UPF is responsible for sending received user plane data to the RAN node in a point-to-point (unicast) or point-to-multipoint (multicast) manner.

The RAN node is responsible for exchanging the control signaling with the MBMS session management unit, receiving the data sent by the UPF, and sending the data to the terminal on a radio broadcast channel over an air interface.

A reference point between the MBMS session management unit and the terminal is used to exchange MBMS transmission control signaling (namely, transmission-related signaling, where the control signaling is used to establish, in a communications network, a user plane transmission path for transmitting the service data). A reference point between the MBMS session management unit and the UPF is used to exchange the MBMS transmission control signaling. A reference point between the MBMS session management unit and the AMF is used to exchange the MBMS transmission control signaling.

The reference point between the MBMS service control unit and the terminal is used to exchange MBMS service control signaling (namely, service-related signaling), where the signaling is used to notify the terminal of service-related description information or a mapping relationship between a service and a multicast transmission path (for example, which service is transmitted on which multicast transmission path).

A reference point between the MBMS service control unit and the MBMS session management unit is used to exchange the MBMS transmission control signaling and the media data.

Figure 5:
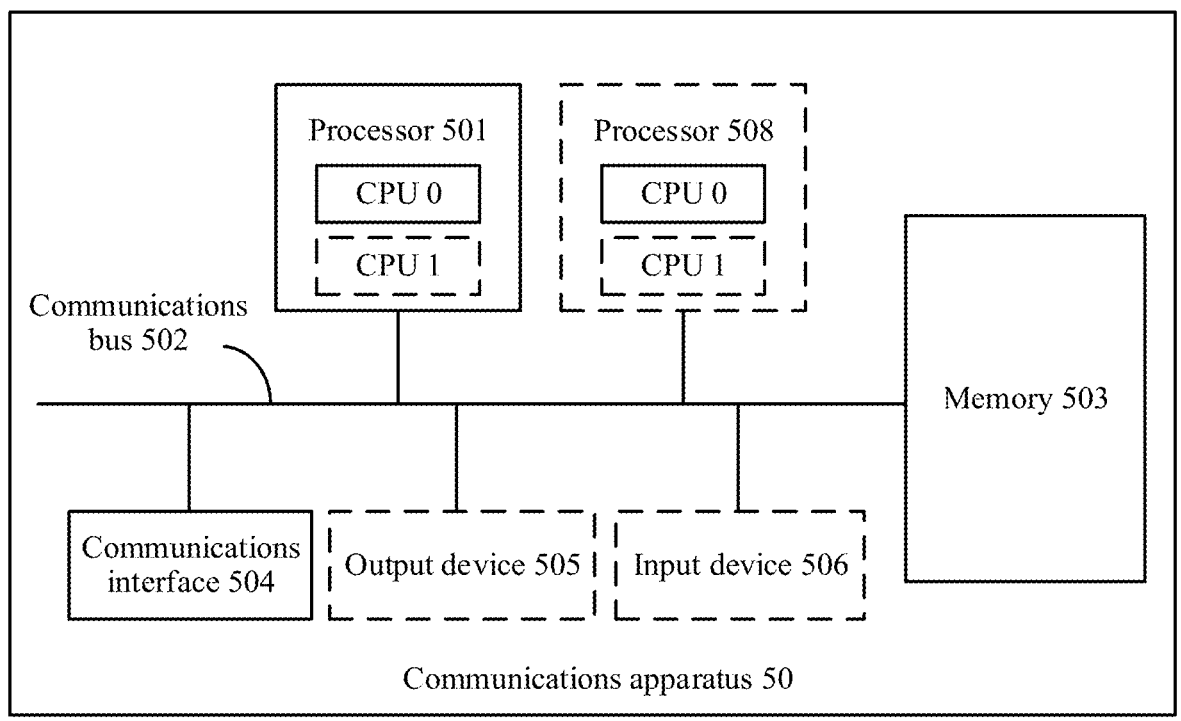
FIG. 5 is a schematic diagram of a hardware structure of a communications apparatus according to an embodiment of this application.

FIG. 5 is a schematic diagram of a hardware structure of a communications apparatus 50 according to an embodiment of this application. The communications apparatus 50 may be a first core network device, a second core network device, a unicast user plane gateway, a multicast user plane gateway, a terminal, or a service server below. The communications apparatus 50 includes at least one processor (such as a processor 501 and a processor 508), a communications bus 502, a memory 503, and at least one communications interface 504.

The processor 501 may be one or more general-purpose central processing units (CPU), a microprocessor, an application-specific integrated circuit (ASIC), or one or more integrated circuits configured to control program execution of the solutions in this application.

The communications bus 502 is used for communication between the foregoing components, to transmit information.

The communications interface 504 is configured to communicate with another device or a communications network such as an Ethernet, a RAN node, or a wireless local area network (WLAN), and may use any apparatus such as a transceiver.

The memory 503 is configured to store a computer-executable instruction for executing the solutions in this application, and the processor 501 controls execution of the computer-executable instruction. The processor 501 is configured to execute the computer-executable instruction stored in the memory 503, to implement the method provided in the following embodiments of this application, for example, perform actions of the first core network device, the second core network device, the unicast user plane gateway, the multicast user plane gateway, the terminal, or the service server below. The memory 503 may be a read-only memory (ROM) or another type of static storage device that can store static information and an instruction, or a random access memory (RAM) or another type of dynamic storage device that can store information and an instruction. Alternatively, the memory 503 may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer, but is not limited thereto. The memory 503 may exist independently, and is connected to the processor 501 by using the communications bus 502. Alternatively, the memory 503 may be integrated into the processor 501.

Optionally, the computer-executable instruction in this embodiment of this application may also be referred to as application program code. This is not specifically limited in this embodiment of this application.

In an embodiment, the processor 501 may include one or more CPUs, for example, a CPU 0 and a CPU 1 in FIG. 5.

In an embodiment, the communications apparatus 50 may include a plurality of processors, for example, the processor 501 and the processor 508 in FIG. 5. Each of the processors may be a single-core (single-CPU) processor or a multi-core (multi-CPU) processor. The processor herein may refer to one or more devices, circuits, and/or processing cores configured to process data (for example, a computer program instruction).

In an embodiment, the communications apparatus 50 may further include an output device 505 and an input device 506. The output device 505 communicates with the processor 501, and may display information in a plurality of manners. The input device 506 communicates with the processor 501, and may receive an input of a user in a plurality of manners.

For ease of understanding of the technical solutions in the embodiments of this application, brief descriptions of related content in this application are first provided.

A unicast transmission path is a transmission path between a DN and user plane data of one user, and may be used to transmit uplink and downlink data. There may be a plurality of unicast transmission paths between one terminal and one DN. The unicast transmission path may be distinguished based on a QoS requirement. In a 5G communications system, the unicast transmission path may be a QoS flow. The unicast transmission path may also be referred to as a unicast bearer or a unicast stream. For ease of description, in subsequent embodiments of this application, the unicast transmission path is used as an example for description.

A multicast transmission path is a downlink transmission path used by a DN to transmit same user plane data to a group of users. The multicast transmission path may be a data flow corresponding to a multicast session (for example, an MBMS session). One UPF and at least one RAN may be included on one multicast transmission path. The UPF may send the user plane data to the at least one RAN, and then the at least one RAN sends the user plane data to the group of users on broadcast channel of an air interface. The multicast transmission path may be distinguished based on a QoS requirement and/or a service area (such as a network area or a geographic location area). To be specific, the multicast transmission path may be used to transmit service data that is of the users and that meets the QoS requirement and/or that is in the service area. The multicast transmission path may be identified by using a multicast transmission path identifier. For example, the multicast transmission path identifier may be a temporary group identity (TMGI), or may be a combination of a TMGI and a flow identity (flow ID). The multicast transmission path may also be referred to as a multicast bearer (such as an MBMS bearer), a group flow, or a multicast flow. For ease of description, in subsequent embodiments of this application, the multicast transmission path is used as an example for description. A group of users includes a plurality of users, and may usually be obtained through division based on a service area. For example, terminals in an administrative region B of a city A may be a group of users.

Multicast session is context information between a group of users and a DN that provides a multicast service. The context information may be stored in a plurality of control plane network elements, and the control plane network elements may update and delete the stored context information. The context information may include an identifier of a multicast transmission path, a QoS parameter of the multicast service, a service area of the multicast service, a cell identifier list of cells covered by the multicast service, transmission duration of the multicast service, a transmission start time of the multicast service, and the like. The multicast session may also be referred to as a group session, or the like.

In the embodiments of this application, multicast may be replaced with multicast or broadcast. This is not limited. It should be noted that nouns or terms in the embodiments of this application may refer to each other. This is not limited.

Figure 6:
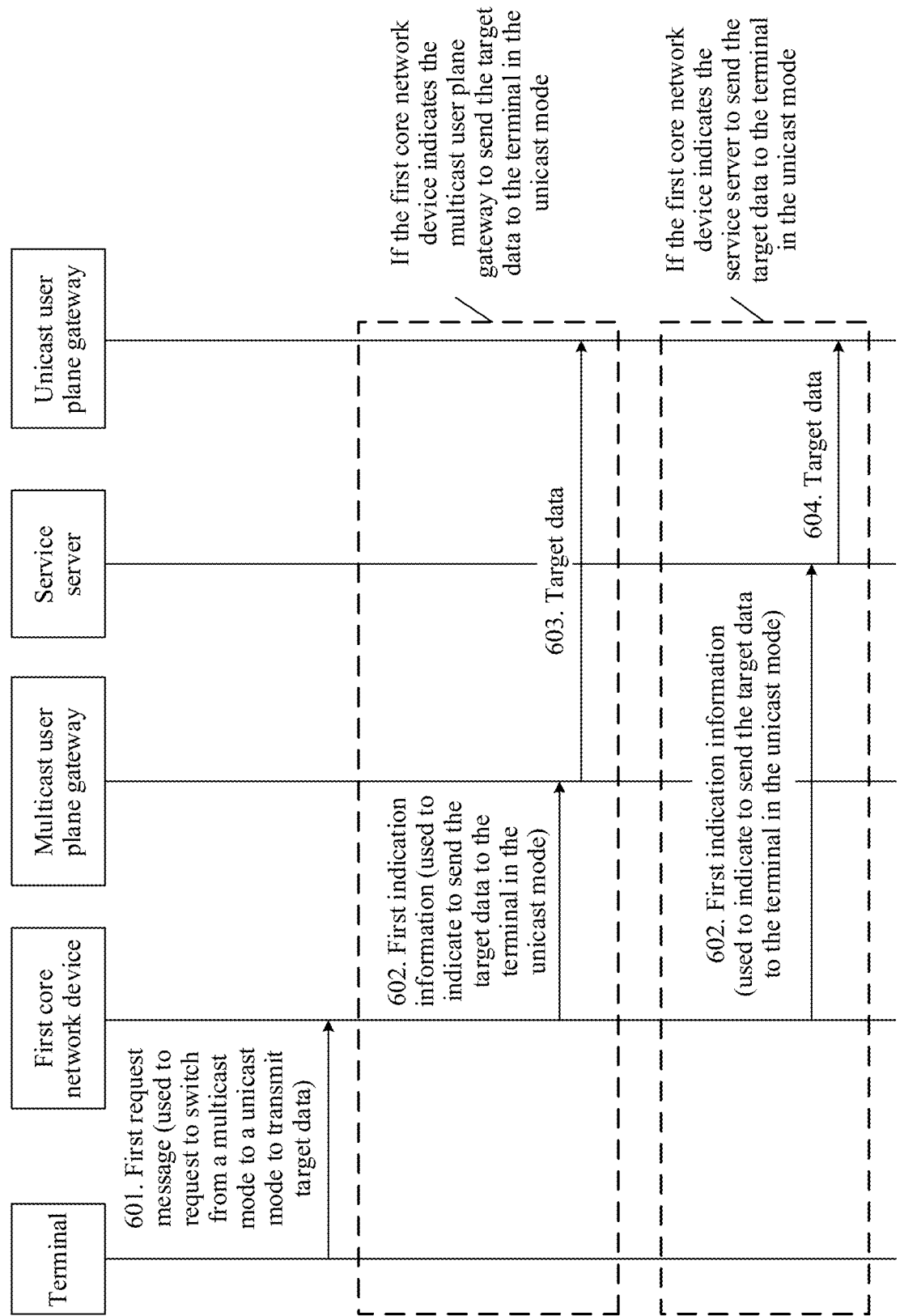
FIG. 6 to FIG. 9 each are a schematic diagram of a flowchart of a communication method according to an embodiment of this application.

An embodiment of this application provides a communication method. As shown in FIG. 6, the method includes the following steps.

601. A terminal sends a first request message to a first core network device.

Correspondingly, the first core network device receives the first request message from the terminal.

The first request message is used to request to switch from a multicast mode to a unicast mode to transmit service data (which may also be referred to as target data) to be sent to the terminal. Alternatively, the first request message is used to request to transmit target data in a unicast mode.

The first request message may be a message such as a path switching request message, a switching request message, a path switching message, a unicast switching request, a multicast-to-unicast switching request, or a multicast session update request. For example, the first request message is an SM NAS message.

For example, transmission of the target data in the multicast mode may be transmission of the target data on a multicast transmission path. In this case, the target data may be transmitted on a broadcast channel over an air interface. Transmission of the target data in the unicast mode may be transmission of the target data on a unicast transmission path. In this case, the target data may be transmitted on a unicast channel over the air interface.

It should be noted that, assuming that the target data is transmitted in the multicast mode, a RAN node on the multicast transmission path may send, in the multicast mode, the target data to all terminals that are in a terminal group to which the terminal belongs; assuming that the target data is transmitted in the unicast mode, a RAN node on the unicast transmission path may send the target data to the terminal in a point-to-point manner. The terminal group may include at least two terminals.

Transmission of the target data in the multicast mode may be transmission of the target data on the multicast transmission path, and transmission of the target data in the unicast mode may be transmission of the target data on the unicast transmission path. Therefore, alternatively, the first request message is used to request to switch from the multicast transmission path to the unicast transmission path for the target data. The multicast transmission path is a to-be-switched multicast transmission path or a multicast transmission path used before switching, and may be referred to as a source multicast transmission path. The unicast transmission path is a unicast transmission path to be switched to, and may be referred to as a target unicast transmission path.

The source multicast transmission path may be determined by the terminal. In this case, the first request message may include an identifier of the source multicast transmission path. Therefore, the first request message may be used to request to switch from the source multicast transmission path corresponding to the identifier of the source multicast transmission path to the target unicast transmission path.

The source multicast transmission path may alternatively be determined by the first core network device. In this case, the first request message may include an identifier of the multicast transmission path, and information about receiving quality on the multicast transmission path. If the information about the receiving quality indicates that the receiving quality on the multicast transmission path is relatively poor, the first core network device may determine to switch the multicast transmission path (namely, the source multicast transmission path).

The target unicast transmission path may be determined by the terminal. In this case, the first request message may include an identifier of the target unicast transmission path, and the first core network device may determine to switch from the source multicast transmission path to the target unicast transmission path corresponding to the identifier that is of the target unicast transmission path and that is included in the first request message.

The target unicast transmission path may alternatively be determined by the first core network device. In this case, the first request message may include an identifier of the terminal or an identifier of a PDU session of the terminal, and the first core network device may determine the target unicast transmission path based on the identifier of the terminal or the identifier of the PDU session of the terminal. For details, refer to the following manner 1. Alternatively, the first request message may not include an identifier of the terminal or an identifier of a PDU session of the terminal, and the first core network device may determine the target unicast transmission path. For details, refer to the following manner 2.

Optionally, step 601 is replaced with the following: A terminal sends a first request message to a first core network device based on receiving quality of the terminal on a multicast transmission path.

In an example embodiment, the terminal may detect the receiving quality on the multicast transmission path, for example, detect a packet loss rate, a received signal strength, a block error rate, or the like of the terminal on the multicast transmission path. When the receiving quality meets a preset condition, for example, when the received signal strength is less than a preset threshold, or for another example, when the packet loss rate is greater than or equal to a preset threshold, the terminal may use the multicast transmission path as a source multicast transmission path, and send, to the first core network device, the first request message that carries an identifier of the source multicast transmission path, to request the first core network device to switch the source multicast transmission path. Alternatively, the terminal may include, in the first request message, an identifier of a multicast transmission path on which receiving quality meets a preset condition, and information about receiving quality on the multicast transmission path, so that the first core network device determines a source multicast transmission path.

In another example embodiment, the terminal may use, as a source multicast transmission path, a multicast transmission path on which the terminal has the worst receiving quality among multicast transmission paths, and send, to the first core network device, the first request message that carries an identifier of the source multicast transmission path, to request the first core network device to switch the source multicast transmission path. For example, the terminal may use, as the source multicast transmission path, a multicast transmission path with the highest packet loss rate among the multicast transmission paths. Alternatively, the terminal may include, in the first request message, an identifier of a multicast transmission path on which the terminal has the worst receiving quality among multicast transmission paths, and information about the receiving quality on the multicast transmission path, so that the first core network device determines a source multicast transmission path.

In addition, the terminal may alternatively use, as a source multicast transmission path, a multicast transmission path suspended by a RAN node, and send, to the first core network device, the first request message that carries an identifier of the source multicast transmission path, to request the first core network device to switch the source multicast transmission path.

It should be noted that before the switching from the source multicast transmission path to the target unicast transmission path for the target data, the terminal may receive service data on the source multicast transmission path. The service data and the target data may belong to a same service. After the switching from the source multicast transmission path to the target unicast transmission path for the target data, the source multicast transmission path may still be used to send the service data of the service in the multicast mode. In other words, the terminals in the terminal group may still receive the service data of the service on the source multicast transmission path.

The first core network device may be a control plane session management network element configured to manage the source multicast transmission path. For example, the first core network device may be an MBMS session management unit. When functions of the MBMS session management unit are integrated into an SMF, the first core network device may be the SMF.

602. The first core network device indicates, based on the first request message, a multicast user plane gateway and/or a service server corresponding to the terminal to send the target data to the terminal in the unicast mode.

The multicast user plane gateway corresponding to the terminal may be configured to transmit the service data carried on the source multicast transmission path. For example, the multicast user plane gateway may be a UPF. In this embodiment of this application, the multicast user plane gateway corresponding to the terminal may be understood as a multicast user plane gateway via which the terminal can receive the target data. The service server corresponding to the terminal may be understood as a server that sends the target data. The service server may be an application service server or an MBMS service control unit. The application service server may be an application service server of an operator, or may be an application service server of a third party. This is not limited.

The indication may be performed in an explicit manner. For example, the first core network device may send indication information (which may be referred to as first indication information) to the multicast user plane gateway and/or the service server. The first indication information is used to indicate to send the target data to the terminal in the unicast mode. The first indication information may be one parameter such as a type of a message or a name of a message, or a set of a plurality of parameters carried in the message, or may be the message.

Alternatively, the indication may be performed in an implicit manner. For example, the first core network device may indicate, in a manner in which a special information element is not carried in a message, the multicast user plane gateway and/or the service server to send the target data to the terminal in the unicast mode.

In an example, it is assumed that the first indication information is information about a unicast user plane gateway corresponding to the terminal. The unicast user plane gateway may be configured to transmit service data carried on the target unicast transmission path, and the unicast user plane gateway may be a UPF. The unicast user plane gateway corresponding to the terminal may be understood as a unicast user plane gateway via which the terminal can receive the target data. In this case, in an embodiment of a specific implementation, step 602 may include: The first core network device sends the information about the unicast user plane gateway to the multicast user plane gateway and/or the service server based on the first request message. Correspondingly, the multicast user plane gateway and/or the service server receive/receives the information about the unicast user plane gateway from the first core network device. Further, the multicast user plane gateway and/or the service server may determine the unicast user plane gateway based on the information about the unicast user plane gateway, and may further determine to send the target data to the terminal in the unicast mode.

In another example, assuming that the first indication information is values of one or more bits carried in a message, the multicast user plane gateway and/or the service server determines, based on the values of the one or more bits, to send the target data to the terminal in the unicast mode. In this case, the method may further include: The first core network device sends information about a unicast user plane gateway to the multicast user plane gateway and/or the service server. Correspondingly, the multicast user plane gateway and/or the service server receive/receives the information about the unicast user plane gateway from the first core network device. Further, the multicast user plane gateway and/or the service server may use the unicast user plane gateway corresponding to the information about the unicast user plane gateway as a unicast user plane gateway corresponding to the terminal. For details, refer to related descriptions in the foregoing example.

The information about the unicast user plane gateway and the first indication information may be included in a same message for transmission, or may be included in different messages for transmission.

In addition, the information about the unicast user plane gateway is used to determine the unicast user plane gateway, and may be an identifier of the unicast user plane gateway, for example, a name of the unicast user plane gateway, an address (such as an IP address, a fully-qualified domain name (FQDN), a uniform resource identifier (URI), or a uniform resource locator (URL)) of the unicast user plane gateway, or a tunnel identifier of the unicast user plane gateway.

Optionally, if the first core network device indicates the multicast user plane gateway to send the target data to the terminal in the unicast mode, the multicast user plane gateway receives the first indication information from the first core network device, and performs step 603 after step 602. If the first core network device indicates the service server to send the target data to the terminal in the unicast mode, the service server receives the first indication information from the first core network device, and performs step 604 after step 602. If the first core network device indicates the multicast user plane gateway and the service server to send the target data to the terminal in the unicast mode, the multicast user plane gateway and the service server receive the first indication information, and perform step 603 and step 604 after step 602, respectively. There is no execution sequence between 603 and 604.

603. The multicast user plane gateway sends, to the unicast user plane gateway based on the first indication information, the target data received from the service server.

In an embodiment of a specific implementation, step 603 may include: The multicast user plane gateway determines the unicast user plane gateway based on the first indication information, and sends, to the unicast user plane gateway, the target data received from the service server.

For example, when the first indication information is the information about the unicast user plane gateway, the multicast user plane gateway may determine the unicast user plane gateway based on the information that is about the unicast user plane gateway and that is received from the first core network device. When the first indication information is the values of the one or more bits, if further receiving the information about the unicast user plane gateway from the first core network device, the multicast user plane gateway determines the unicast user plane gateway based on the information about the unicast user plane gateway; if not receiving the information about the unicast user plane gateway from the first core network device, the multicast user plane gateway may determine, as the unicast user plane gateway, a unicast user plane gateway configured in the multicast user plane gateway. It should be noted that when there is only one unicast user plane gateway in a communications network, an operator of the communications network may configure information about the unicast user plane gateway in the multicast user plane gateway, so that the multicast user plane gateway determines the unicast user plane gateway.

604. The service server sends the target data to the unicast user plane gateway based on the first indication information.

In an embodiment of a specific implementation, step 604 may include: The service server determines the unicast user plane gateway based on the first indication information, and sends the target data to the unicast user plane gateway.

For example, when the first indication information is the information about the unicast user plane gateway, the service server may determine the unicast user plane gateway based on the information that is about the unicast user plane gateway and that is received from the first core network device. When the first indication information is the values of the one or more bits, if further receiving the information about the unicast user plane gateway from the first core network device, the service server determines the unicast user plane gateway based on the information about the unicast user plane gateway; if not receiving the information about the unicast user plane gateway from the first core network device, the service server may determine, as the unicast user plane gateway, a unicast user plane gateway configured in the service server. It should be noted that when there is only one unicast user plane gateway in a communications network, an operator of the communications network may configure information about the unicast user plane gateway in the service server, so that the service server determines the unicast user plane gateway.

After step 603 and/or step 604, the method may further include: The unicast user plane gateway sends the received target data to the terminal. Correspondingly, the terminal receives the target data from the unicast user plane gateway.

According to the method provided in the foregoing embodiment, the multicast user plane gateway and/or the service server may send the target data to the unicast user plane gateway, to send the target data to the terminal in the unicast mode.

Optionally, the method further includes: The terminal receives the target data from the unicast user plane gateway and the multicast user plane gateway. After a preset time period, the terminal receives the target data from the unicast user plane gateway.

After the switching from the source multicast transmission path to the target unicast transmission path for the target data, to ensure continuity and reliability of a service of the terminal, double stream transmission in a period of time may be performed on the communications network, and the terminal receives the target data on both the source multicast transmission path and the target unicast transmission path (that is, the terminal receives the target data from the unicast user plane gateway and the multicast user plane gateway). In this case, in step 603, the multicast user plane gateway may replicate the received target data to obtain two pieces of data. One piece of data is still sent, in the multicast mode on the source multicast transmission path, to the terminal group that includes the terminal, and the other piece of data is sent to the terminal on the target unicast transmission path. After the preset time period, the terminal may receive the data only on the target unicast transmission path.

Optionally, before step 603 and/or step 604, the method further includes: The first core network device sends the identifier of the source multicast transmission path to the multicast user plane gateway and/or the service server. Correspondingly, the multicast user plane gateway and/or the service server receive/receives the identifier of the source multicast transmission path, and determine/determines the target data based on the identifier of the source multicast transmission path. For example, the multicast user plane gateway and/or the service server may determine, as the target data, data that carries the identifier of the source multicast transmission path.

Optionally, before step 603 and/or step 604, the method further includes: The first core network device sends a user plane address and a port number of the multicast user plane gateway to the multicast user plane gateway and/or the service server. Correspondingly, the multicast user plane gateway and/or the service server may determine the target data based on the user plane address and the port number of the multicast user plane gateway. For example, the multicast user plane gateway and/or the service server may determine, as the target data, data that is sent to the user plane address and the port number of the multicast user plane gateway.

According to the method provided in this embodiment of this application, after receiving the first request message, the first core network device indicates the service server and/or the multicast user plane gateway to send the target data to the terminal in the unicast mode, so that the service server and/or the multicast user plane gateway can send the target data to the terminal in the unicast mode based on the indication. In this way, a core network device completes path switching, thereby avoiding prior-art problems of a long transmission path and a large transmission delay of signaling that are caused because a DN to which application layer control signaling used to control the path switching needs to be transmitted for processing is outside a mobile communications network.

Optionally, the foregoing method further includes: (11) The first core network device obtains the information about the unicast user plane gateway based on the first request message.

Step (11) may be performed before "the first core network device sends information about a unicast user plane gateway to the multicast user plane gateway and/or the service server".

In an embodiment of an implementation scenario, a second core network device is a control plane session management network element configured to manage the target unicast transmission path. In the embodiment of the implementation scenario:

In an embodiment of a specific implementation, step (11) may include the following steps:

(21) The first core network device requests the information about the unicast user plane gateway from the second core network device based on the first request message. For example, the first core network device sends a second request message to the second core network device based on the first request message, to request the information about the unicast user plane gateway.

(22) The second core network device receives the second request message from the first core network device.

(23) The second core network device sends the information about the unicast user plane gateway to the first core network device based on the second request message.

(24) The first core network device receives the information about the unicast user plane gateway from the second core network device.

The second core network device may be an SMF.

The second request message may be a message such as a user plane gateway request message, a path switching request message, a switching request message, a path switching message, a unicast switching request, a multicast-to-unicast switching request, or a multicast session update request.

Optionally, the second request message includes at least one of the identifier of the target unicast transmission path, the identifier of the terminal, and the identifier of the PDU session of the terminal. At least one of the identifier of the target unicast transmission path, the identifier of the terminal, and the identifier of the PDU session of the terminal is used by the second core network device to determine the unicast user plane gateway.

In an example, when the second request message includes the identifier of the target unicast transmission path, because the second core network device is the control plane session management network element configured to manage the target unicast transmission path, the second core network device may store a correspondence between the identifier of the target unicast transmission path and the unicast user plane gateway; and in step (23), the second core network device may determine the unicast user plane gateway based on the correspondence and the identifier that is of the target unicast transmission path, and send the information about the unicast user plane gateway to the first core network device.

In another example, when the second request message includes at least one of the identifier of the terminal and the identifier of the PDU session of the terminal, in step (23), the second core network device selects a unicast user plane gateway from unicast user plane gateways corresponding to the terminal or the PDU session of the terminal, and sends information about the unicast user plane gateway to the first core network device. For example, the second core network device may select a unicast user plane gateway with the lowest load from the unicast user plane gateways corresponding to the terminal or the PDU session of the terminal, and send information about the unicast user plane gateway to the first core network device.

Optionally, in an embodiment of a specific implementation, step (21) includes the following steps:

(31) The first core network device determines the target unicast transmission path based on the first request message.

(32) The first core network device determines the second core network device based on the target unicast transmission path.

(33) The first core network device requests the information about the unicast user plane gateway from the second core network device.

Optionally, the first request message further includes the identifier of the terminal, the identifier of the PDU session of the terminal, or an identifier of a QoS flow of the terminal. In this case, step (31) may be implemented in the following manner 1. When the first request message does not include the identifier of the terminal, the identifier of the PDU session of the terminal, or the identifier of the QoS flow of the terminal, step (31) may be implemented in the following manner 2.

Manner 1: The first core network device determines the target unicast transmission path based on the identifier of the terminal, the identifier of the PDU session of the terminal, or the identifier of the QoS flow of the terminal in the first request message. For details, refer to the following description:

When the first request message includes the identifier of the terminal, the first core network device determines one QoS flow in at least one QoS flow corresponding to the identifier of the terminal as the target unicast transmission path.

Alternatively, when the first request message includes the identifier of the PDU session of the terminal, the first core network device determines one QoS flow in at least one QoS flow corresponding to the identifier of the PDU session of the terminal as the target unicast transmission path.

Alternatively, when the first request message includes the identifier of the QoS flow, the first core network device determines the QoS flow corresponding to the identifier of the QoS flow as the target unicast transmission path.

Manner 2: The first core network device obtains a plurality of unicast transmission paths of the terminal, and determines the target unicast transmission path from the plurality of unicast transmission paths of the terminal.

Specifically, the first core network device may obtain the plurality of unicast transmission paths of the terminal from a UDM or a PCF.

For example, when the first request message in manner 1 includes the identifier of the terminal or the identifier of the PDU session of the terminal, or the first core network device determines the target unicast transmission path in manner 2, in an example embodiment of an implementation, the first core network device may determine the target unicast transmission path based on one or more attributes of a QoS flow. For example, the first core network device may select a QoS flow whose 5G quality of service identifier (5QI) value or QoS flow identifier (QFI) value is the same as or higher than a QoS level required by the target data, or may select a QoS flow whose resource allocation and preemption priority (allocation and retention priority) is the same as or higher than a resource allocation and preemption priority required by the target data. In another example embodiment of an implementation, the first core network device may determine, as the target unicast transmission path, a unicast transmission path that is on a unicast user plane gateway closest to a location of the multicast user plane gateway, to reduce signaling overheads between the multicast user plane gateway and the unicast user plane gateway, and reduce a transmission delay between the multicast user plane gateway and the unicast user plane gateway.

In an embodiment of a specific implementation of step (32), the first core network device may obtain, from the UDM or the PCF, a correspondence between the unicast transmission path and the control plane session management network element that is used to manage the unicast transmission path, to determine the second core network device based on the correspondence and the target unicast transmission path.

Optionally, to enable the unicast user plane gateway to correctly send the target data to the terminal, the foregoing method further includes the following steps:

(41) The second core network device indicates the unicast user plane gateway to send, to the terminal on the target unicast transmission path, the received target data, where the received target data is originally sent on the source multicast transmission path, and switching is performed from the source multicast transmission path to the target unicast transmission path.

(42) The unicast user plane gateway receives an indication that is used to indicate to send, to the terminal on the target unicast transmission path, the received target data, where the received target data is originally sent on the source multicast transmission path, and switching is performed from the source multicast transmission path to the target unicast transmission path.

(43) The unicast user plane gateway receives the target data.

(44) The unicast user plane gateway sends the target data to the terminal on the target unicast transmission path based on the indication.

The indication in step (41) may be performed in an explicit manner. For example, the second core network device may send indication information (which may be referred to as second indication information) to the unicast user plane gateway. The second indication information is used to indicate the unicast user plane gateway to send the target data to the terminal on the target unicast transmission path. The second indication information may be one parameter such as a type of a message or a name of a message, or a set of a plurality of parameters carried in the message, or may be the message.

The indication in step (41) may alternatively be performed in an implicit manner. For example, the second core network device may indicate, in a manner in which a special information element is not carried in a message, the unicast user plane gateway to send the target data to the terminal on the target unicast transmission path.

In an example, assuming that the second indication information is values of one or more bits carried in a message, the unicast user plane gateway determines, based on the values of the one or more bits, to send the target data to the terminal on the target unicast transmission path.

In another example, it is assumed that the second indication information is the identifier of the target unicast transmission path, and the identifier of the source multicast transmission path. In this case, in an embodiment of a specific implementation, step (41) may include: The second core network device sends the identifier of the target unicast transmission path, and the identifier of the source multicast transmission path to the unicast user plane gateway. In this case, when the second request message includes the identifier of the target unicast transmission path, the first core network device may also include the identifier of the source multicast transmission path in the second request message, and send the second request message to the second core network device. Certainly, the first core network device may alternatively send the identifier of the target unicast transmission path and the identifier of the source multicast transmission path to the second core network device by using another message.

In another example, the second indication information is the identifier of the target unicast transmission path and information about the multicast user plane gateway. In this case, in an embodiment of a specific implementation, step (41) may include: The second core network device sends the identifier of the target unicast transmission path and the information about the multicast user plane gateway to the unicast user plane gateway. In this case, when the second request message includes the identifier of the target unicast transmission path, the first core network device may also include the information about the multicast user plane gateway in the second request message, and send the second request message to the second core network device. Certainly, the first core network device may alternatively send the identifier of the target unicast transmission path and the information about the multicast user plane gateway to the second core network device by using another message.

The information about the multicast user plane gateway may be a tunnel identifier of the multicast user plane gateway, or may be a user plane address and a port number of the multicast user plane gateway. The user plane address of the multicast user plane gateway may be an IP address of the multicast user plane gateway.

In another embodiment of an implementation scenario, the first core network device may be the control plane session management network element configured to manage the target unicast transmission path. In the embodiment of the implementation scenario:

In an embodiment of a specific implementation, step (11) may include the following steps:

(51) The first core network device determines the target unicast transmission path based on the first request message.

(52) The first core network device obtains the information about the unicast user plane gateway based on the target unicast transmission path.

For embodiments of a specific implementation of step (51), refer to the embodiments of step (31) discussed above, and details are not described herein again.

In an embodiment of a specific implementation of step (52), because the first core network device is the control plane session management network element configured to manage the target unicast transmission path, the first core network device may store a correspondence between the target unicast transmission path and the unicast user plane gateway, and may determine the information about the unicast user plane gateway based on the correspondence. The first core network device may alternatively obtain the information about the unicast user plane gateway from a UDM or a PCF. For example, the first core network device includes the identifier of the target unicast transmission path in a request message, and sends the request message to the UDM or the PCF. The request message is used to request the information about the unicast user plane gateway corresponding to the target unicast transmission path. The UDM or the PCF may store a correspondence between the unicast transmission path of the terminal and the unicast user plane gateway. After receiving the request message, the UDM or the PCF may determine the information about the unicast user plane gateway based on the correspondence and the identifier that is of the target unicast transmission path, and send the information about the unicast user plane gateway to the first core network device.

Optionally, to enable the unicast user plane gateway to correctly send the target data to the terminal, the foregoing method further includes steps (61) to (64).

(61) The first core network device indicates the unicast user plane gateway to send the received target data to the terminal on the target unicast transmission path.

Steps (62) to (64) are the same as steps (42) to (44), respectively.

For embodiments of specific implementations of step (61), refer to step (41). A difference lies only in that the first core network device indicates the unicast user plane gateway herein.

Optionally, the foregoing method further includes: The unicast user plane gateway determines the target unicast transmission path based on the received identifier of the target unicast transmission path.

Optionally, the method further includes: The unicast user plane gateway determines the target data based on the received identifier of the source multicast transmission path or received information about the multicast user plane gateway.

For example, an embodiment of an implementation in which the unicast user plane gateway determines the target data based on the received identifier of the source multicast transmission path may be as follows: The unicast user plane gateway may determine, as the target data, received data that carries the identifier of the source multicast transmission path. When the information about the multicast user plane gateway is a tunnel identifier of the multicast user plane gateway, an embodiment of an implementation in which the unicast user plane gateway determines the target data based on the received information about the multicast user plane gateway may be as follows: The unicast user plane gateway may determine, as the target data, data that is of a tunnel identified by the tunnel identifier and that is from the multicast user plane gateway. When the information about the multicast user plane gateway is the user plane address and the port number of the multicast user plane gateway, an embodiment of a an implementation in which the unicast user plane gateway determines the target data based on the received information about the multicast user plane gateway may be as follows: The unicast user plane gateway may determine, as the target data, data that is from the user plane address and the port number of the multicast user plane gateway.

Optionally, after the first core network device determines the target unicast transmission path, the foregoing method further includes: The first core network device sends a response message of the first request message to the terminal.

Correspondingly, the terminal receives the response message of the first request message from the first core network device.

The response message may be used to indicate that the first core network device successfully processes the first request message, that is, the first core network device successfully switches a transmission path of the target data.

Further, the response message may include the identifier of the target unicast transmission path, so that the terminal determines the unicast transmission path for receiving the target data. The response message may be used by the terminal to determine that switching is performed from the source multicast transmission path to the target unicast transmission path to transmit the target data, to ensure that the terminal correctly receives the target data.

In this embodiment of this application, the source multicast transmission path is a multicast transmission path corresponding to the terminal, and the terminal may receive the service data on the corresponding multicast transmission path. The target unicast transmission path is a unicast transmission path corresponding to the terminal, and the terminal may receive the service data on the corresponding unicast transmission path.

The following describes the foregoing method by using an example in which the foregoing method is applied to a 5G network. For details, refer to Embodiment 1 and Embodiment 2. In Embodiment 1 and Embodiment 2, for parts that are the same as those described above but are not explained, refer to the foregoing descriptions of corresponding parts.

Embodiment 1

Figure 7A:
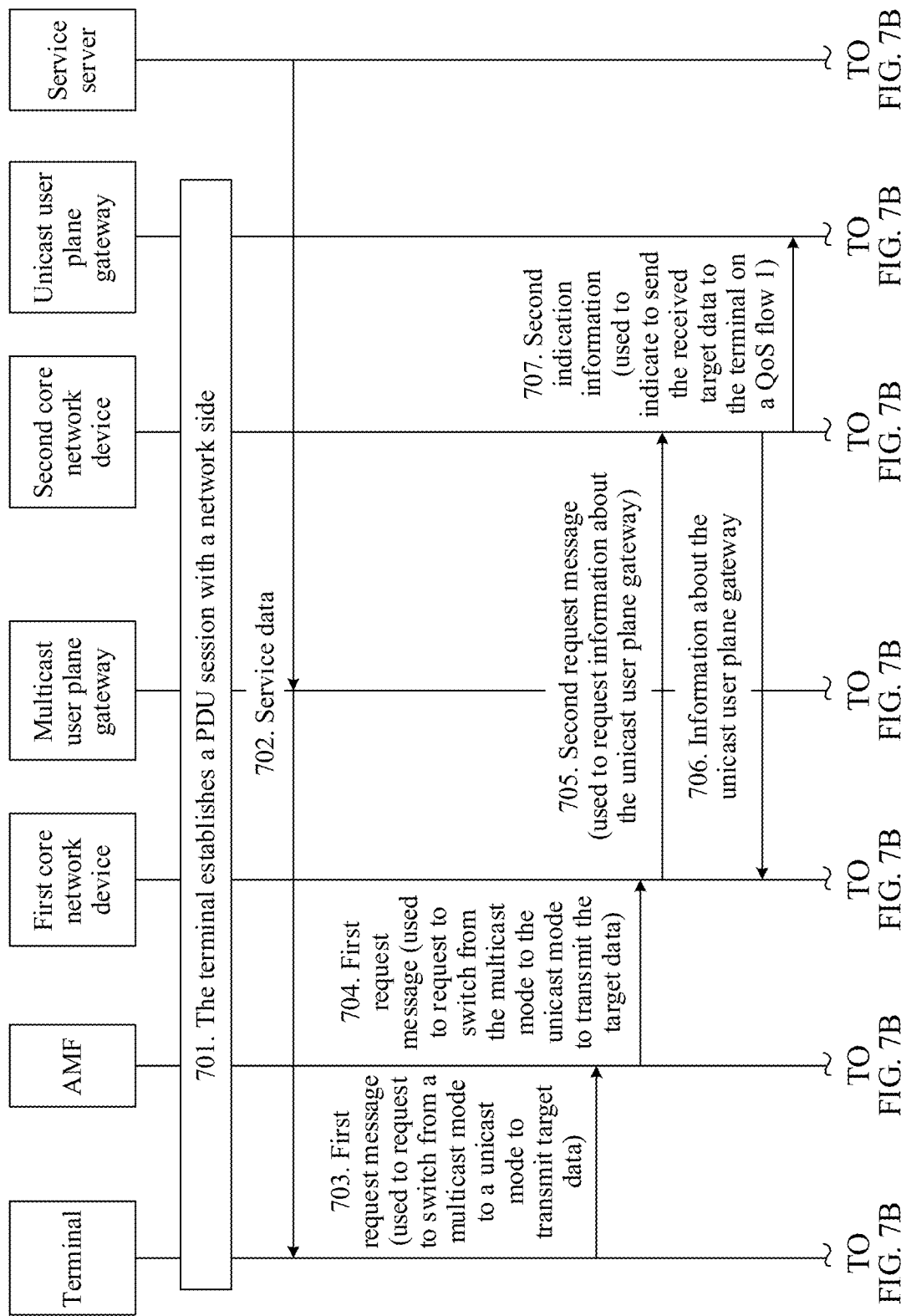
Figure 7B:
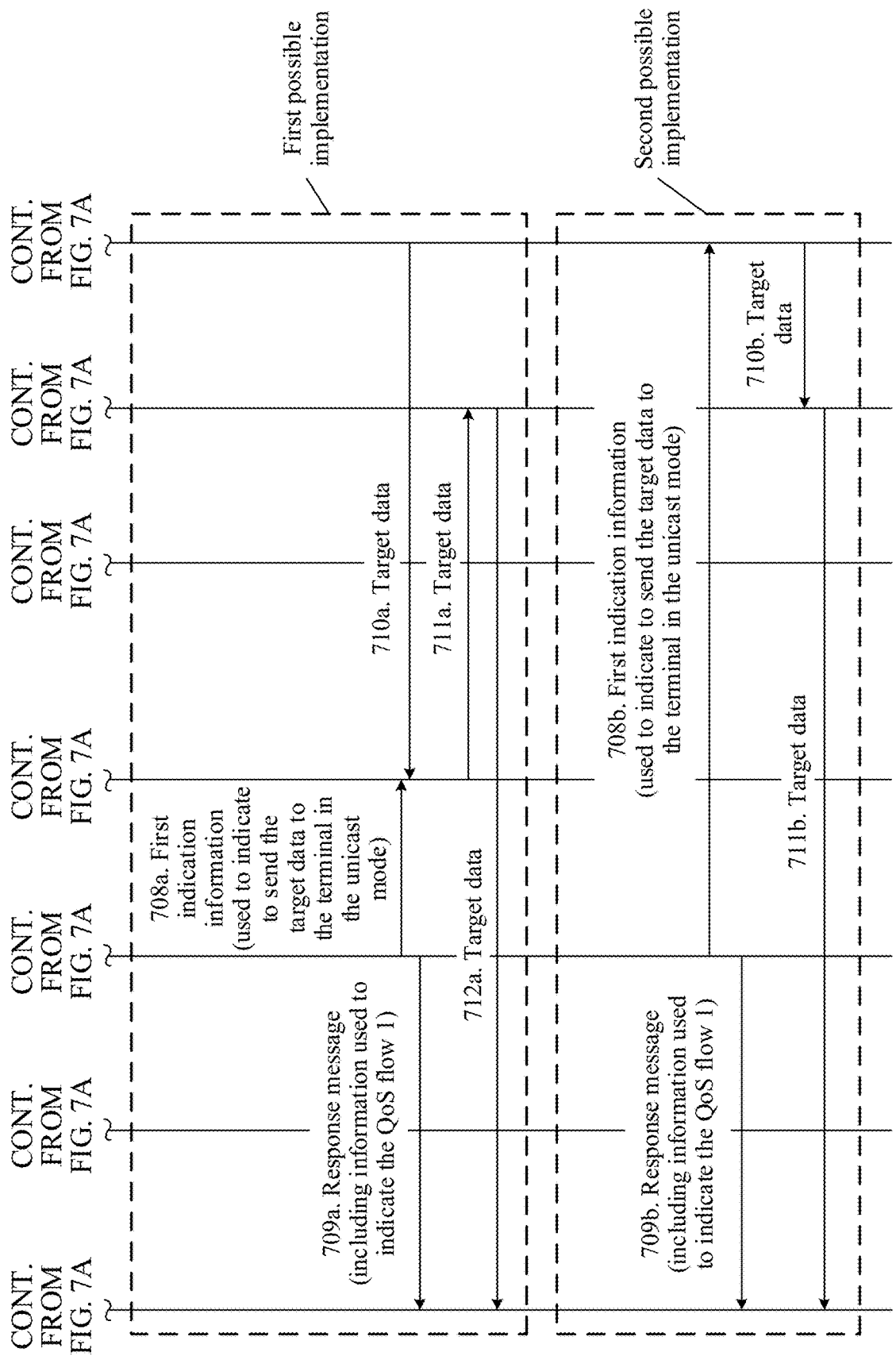

In Embodiment 1, a first core network device may be a control plane session management network element configured to manage a source multicast transmission path, and the second core network device may be a control plane session management network element configured to manage a target unicast transmission path. Referring to FIG. 7A and FIG. 7B, a method provided in Embodiment 1 includes the following steps.

701. A terminal establishes a PDU session with a network side.

For specific embodiments of implementation of step 701, refer to the prior approaches to establishing a PDU session.

The PDU session established between the terminal and the network side may include a plurality of QoS flows. For example, a PDU session 1 established between the terminal and the network side may include a QoS flow 1 and a QoS flow 2.

702. The terminal receives service data of the terminal on the source multicast transmission path.

In embodiments of specific implementations of step 702, the terminal may receive the service data of the terminal on the source multicast transmission path via the multicast user plane gateway.

Step 701 and step 702 are not performed in a particular order.

703. The terminal sends a first request message to an AMF.

Correspondingly, the AMF receives the first request message from the terminal.

In embodiments of specific implementations of step 703, the method may include: The terminal sends the first request message to the AMF based on receiving quality that is on the source multicast transmission path. For example, the terminal may send the first request message to the AMF when determining that the receiving quality does not meet a requirement (for example, when a packet loss rate that the terminal has on the source multicast transmission path is greater than or equal to a preset threshold).

The first request message may be used to request to switch from a multicast mode to a unicast mode to transmit target data. The target data is service data to be sent to the terminal, and the target data and the service data that is received by the terminal on the source multicast transmission path may belong to a same service.

Alternatively, the first request message may be used to request to switch from the source multicast transmission path to the target unicast transmission path for the target data. In this case, the first request message may include an identifier of the source multicast transmission path, and may further include an identifier of the target unicast transmission path.

It should be noted that in Embodiment 1 and Embodiment 2, the foregoing method is described by using an example in which the first request message includes the identifier of the source multicast transmission path and the identifier of the target unicast transmission path, and the target unicast transmission path is the QoS flow 1.

Optionally, the first request message further includes an identifier of the first core network device. The identifier of the first core network device may be used by the AMF to determine the first core network device, to perform step 704.

The first core network device may be the control plane session management network element configured to manage the source multicast transmission path. For example, the first core network device may be an MBMS session management unit. When functions of the MBMS session management unit are integrated into an SMF, the first core network device may be the SMF.

704. The AMF sends the first request message to the first core network device.

Correspondingly, the first core network device receives the first request message from the AMF.

The AMF may send the first request message to the first core network device based on the identifier that is of the source multicast transmission path and that is in the first request message.

For example, the AMF may send, to a UDM or a PCF, a request message that carries the identifier of the source multicast transmission path. The request message is used to request information about the control plane session management network element that manages the source multicast transmission path. The UDM or the PCF stores a correspondence between the multicast transmission path and the control plane session management network element, determines the first core network device based on the correspondence and the identifier that is of the source multicast transmission path, and sends information about the first core network device (for example, the identifier of the first core network device) to the AMF. The AMF sends the first request message to the first core network device corresponding to the information about the first core network device.

When the first request message further includes the identifier of the first core network device, the AMF sends the first request message to the first core network device corresponding to the identifier of the first core network device.

705. The first core network device sends a second request message to the second core network device based on the first request message.

Correspondingly, the second core network device receives the second request message from the first core network device.

The second request message is used to request information about a unicast user plane gateway, and the unicast user plane gateway may be configured to transmit service data carried in the QoS flow 1.

In embodiments of specific implementations of step 705, the first core network device may determine, based on an identifier that is of the QoS flow 1 and that is in the first request message, that the target unicast transmission path used to transmit the target data is the QoS flow 1, may include the identifier of the QoS flow 1 in the second request message, and may send the second request message to the second core network device.

The second core network device may be a device such as an SMF, that allocates the identifier of the QoS flow 1.

706. The second core network device sends the information about the unicast user plane gateway to the first core network device based on the second request message.

Correspondingly, the first core network device receives the information about the unicast user plane gateway from the second core network device.

In embodiments of specific implementations of step 706, the second core network device may determine the unicast user plane gateway based on the identifier that is of the QoS flow 1 and that is in the second request message, and may send the information about the unicast user plane gateway to the first core network device.

Because the second core network device may be the control plane session management network element configured to manage the QoS flow 1, the second core network device may store a correspondence between the identifier of the QoS flow 1 and the unicast user plane gateway, and may determine the unicast user plane gateway based on the correspondence and the identifier that is of the QoS flow 1.

707. The second core network device sends second indication information to the unicast user plane gateway.

Correspondingly, the unicast user plane gateway receives the second indication information from the second core network device.

The second indication information is used to indicate to send the received target data to the terminal on the QoS flow 1.

After step 707, the method may further include: The unicast user plane gateway sends, to the second core network device, a response message used to indicate that the unicast user plane gateway successfully receives the second indication information.

In a first possible embodiment, the multicast user plane gateway may send the target data to the unicast user plane gateway, and the unicast user plane gateway sends the target data to the terminal on the QoS flow 1. In this case, after step 707, steps 708a to 712a may be performed.

In a second possible embodiment, a service server may send the target data to the unicast user plane gateway, and the unicast user plane gateway sends the target data to the terminal on the QoS flow 1. In this case, after step 707, steps 708b to 711b may be performed.

708a. The first core network device sends first indication information to the multicast user plane gateway.

Correspondingly, the multicast user plane gateway receives the first indication information from the first core network device. The multicast user plane gateway may be configured to transmit the service data carried on the source multicast transmission path.

The first indication information is used to indicate to send the target data to the terminal in the unicast mode. Specifically, the first indication information may indicate to send the target data to the terminal via the unicast user plane gateway, to indicate to send the target data to the terminal in the unicast mode.

After step 708a, the multicast user plane gateway may send, to the first core network device, the response message used to indicate that the multicast user plane gateway successfully receives the first indication information.

709a. The first core network device sends a response message to the terminal.

Correspondingly, the terminal receives the response message from the first core network device.

The response message in step 709a may include information used to indicate the QoS flow 1. For example, the information used to indicate the QoS flow 1 may be the identifier of the QoS flow 1.

710a. The multicast user plane gateway receives the target data from the service server.

711a. The multicast user plane gateway sends the target data to the unicast user plane gateway.

Correspondingly, the unicast user plane gateway receives the target data from the multicast user plane gateway.

712a. The unicast user plane gateway sends the target data to the terminal on the QoS flow 1.

708b. The first core network device sends the first indication information to the service server.

Correspondingly, the service server receives the first indication information from the first core network device.

After step 708b, the method may further include: The service server sends, to the first core network device, a response message indicating that the service server successfully receives the first indication information.

709b. The first core network device sends a response message to the terminal.

Correspondingly, the terminal receives the response message from the first core network device.

The response message in step 709b may include information used to indicate the QoS flow 1. For example, the information used to indicate the QoS flow 1 may be the identifier of the QoS flow 1.

710b. The service server sends the target data to the unicast user plane gateway.

Correspondingly, the unicast user plane gateway receives the target data from the service server.

711b. The unicast user plane gateway sends the target data to the terminal on the QoS flow 1.

Embodiment 2

Figure 8A:
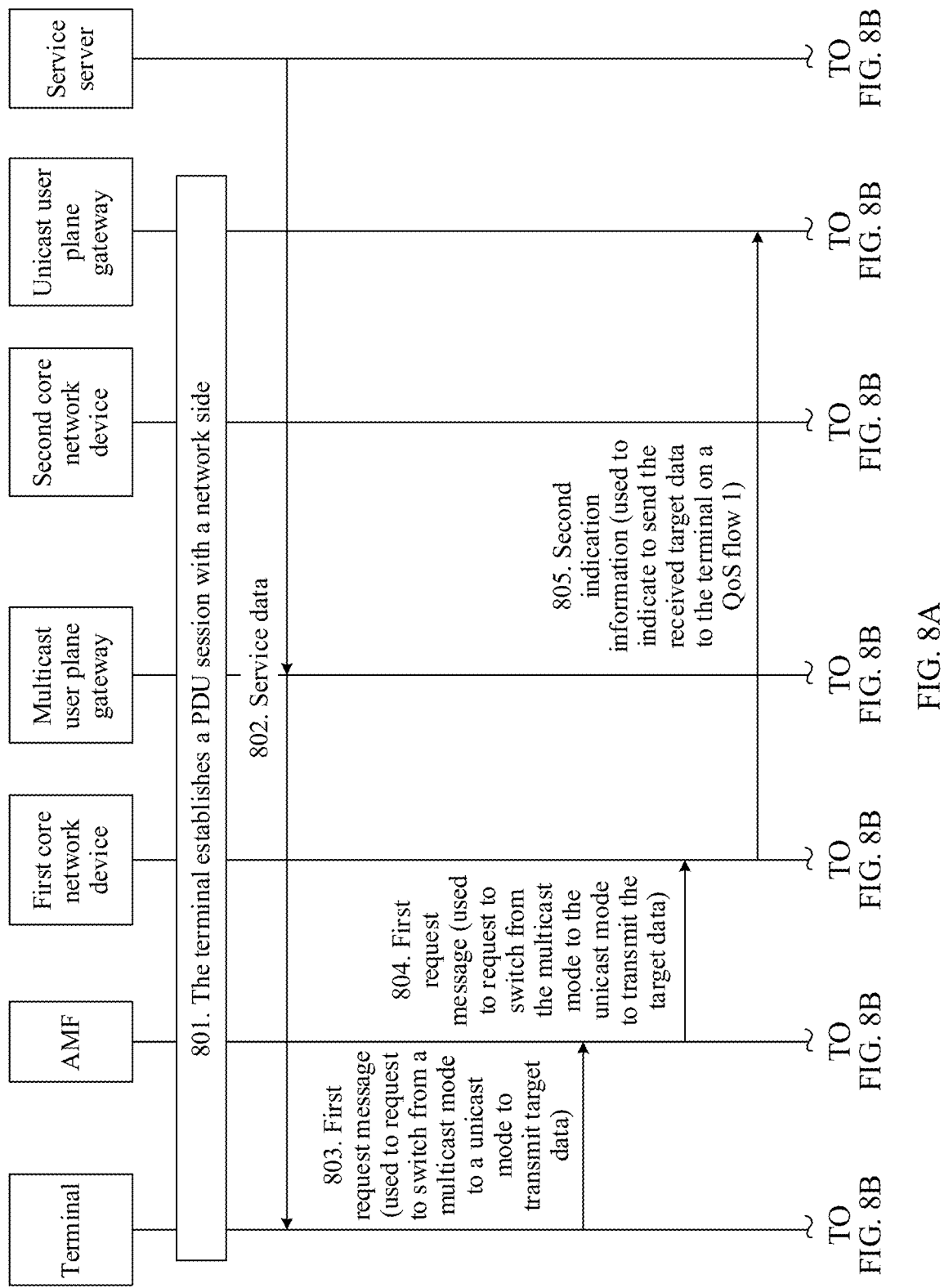
Figure 8B:
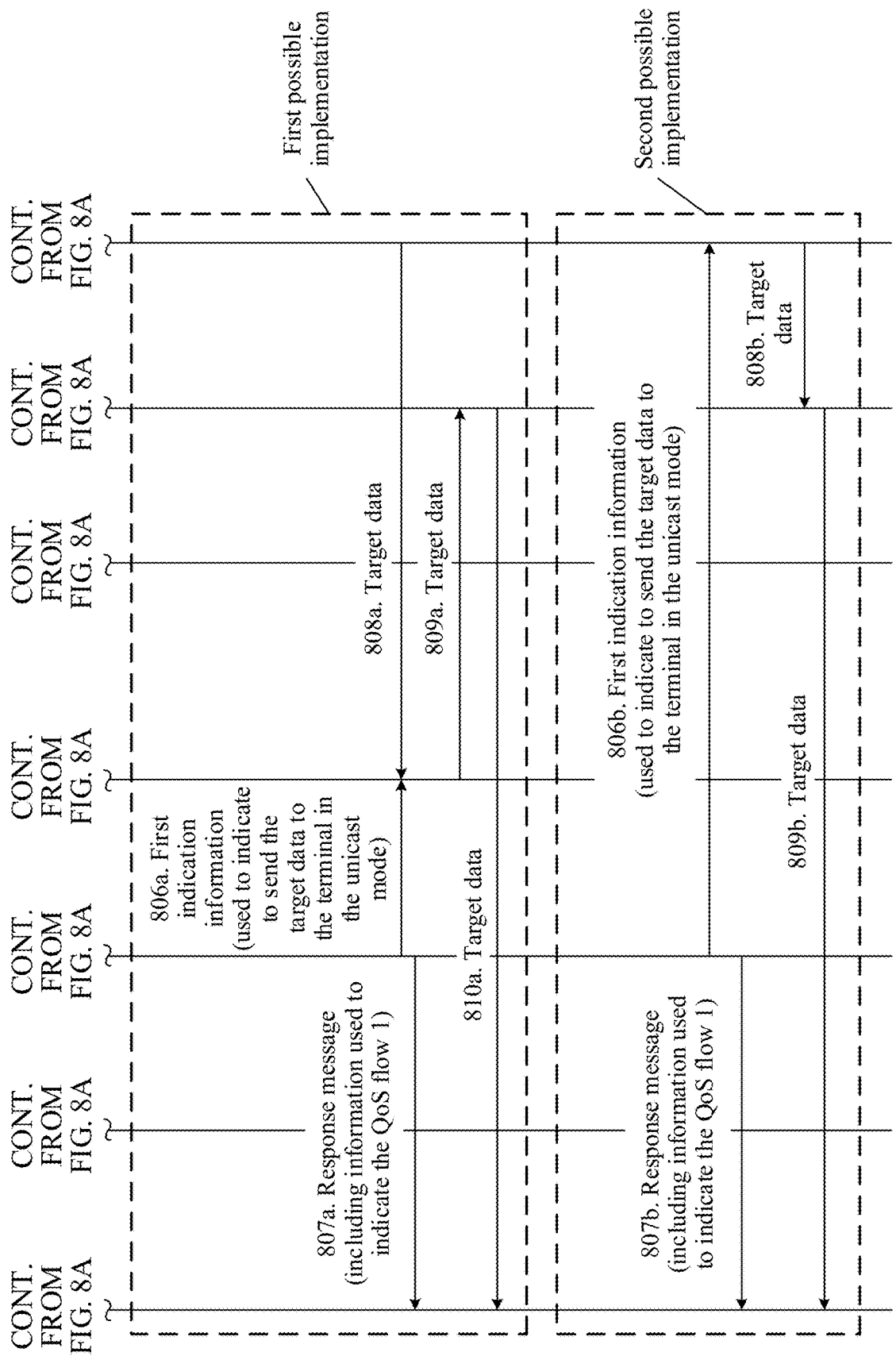

In Embodiment 2, the first core network device is a control plane session management network element configured to manage a source multicast transmission path and a target unicast transmission path. Referring to FIG. 8A and FIG. 8B, a method provided in Embodiment 2 includes the following steps.

Steps 801 to 804 are respectively the same as steps 701 to 704, and details are not described again.

805. The first core network device sends second indication information to a unicast user plane gateway.

Correspondingly, the unicast user plane gateway receives the second indication information from the first core network device.

The second indication information is used to indicate to send received target data to a terminal on a QoS flow 1.

After step 805, the unicast user plane gateway may send, to the first core network device, a response message used to indicate that the unicast user plane gateway successfully receives the second indication information.

In a first possible embodiment, a multicast user plane gateway may send the target data to the unicast user plane gateway, and the unicast user plane gateway sends the target data to the terminal on the QoS flow 1. In this case, after step 805, steps 806a to 810a may be performed.

In a second possible embodiment, a service server may send the target data to the unicast user plane gateway, and the unicast user plane gateway sends the target data to the terminal on the QoS flow 1. In this case, after step 805, steps 806b to 809b may be performed.

Steps 806a to 810a are respectively the same as steps 708a to 712a.

Steps 806b to 809b are respectively the same as steps 708b to 711b.

Because the first core network device in Embodiment 2 is the control plane session management network element configured to manage the source multicast transmission path and the target unicast transmission path, the first core network device already stores information about the unicast user plane gateway. Therefore, in Embodiment 2, interaction between the first core network device and a second core network device is not required (that is, steps 705 and 706 do not exist).

For beneficial effects of Embodiment 1 and Embodiment 2, refer to the foregoing descriptions. Details are not described herein again.

Figure 9:
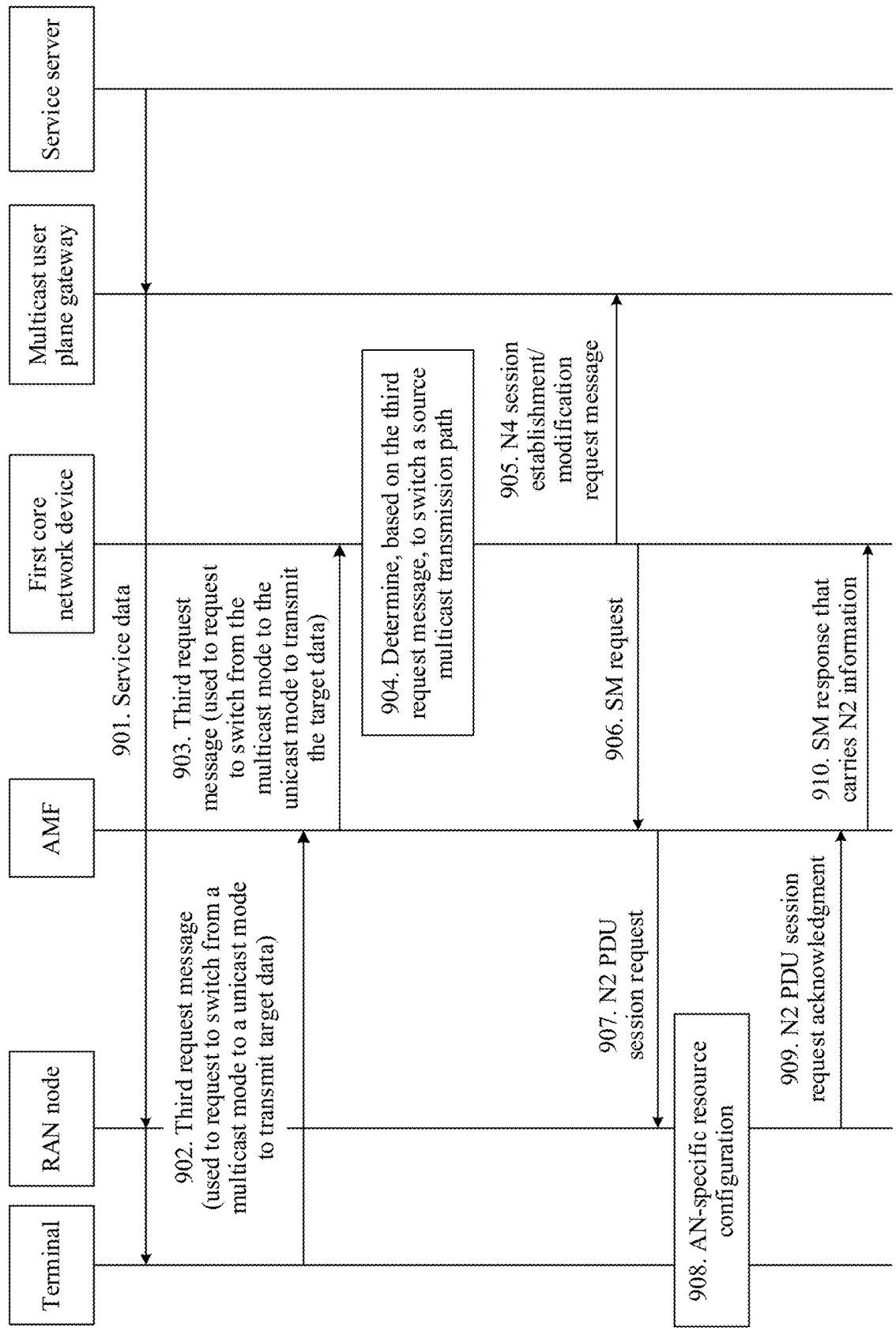

An embodiment of this application further provides a path switching method. In this embodiment, when path switching is performed, there is no unicast transmission path on a terminal. Referring to FIG. 9, the method includes the following steps.

901. The terminal receives service data of the terminal on a source multicast transmission path.

In an embodiment of a specific implementation of step 901, the terminal may receive the service data of the terminal on the source multicast transmission path via a multicast user plane gateway. In this embodiment, for parts that are the same as those described above but are not explained, refer to the foregoing explanations of corresponding parts.

902. The terminal sends a third request message to an AMF.

Correspondingly, the AMF receives the third request message from the terminal.

In an embodiment of a specific implementation of step 902, the method may include: The terminal sends the third request message to the AMF based on receiving quality that is on the source multicast transmission path. For example, the terminal may send the third request message to the AMF when determining that the receiving quality does not meet a requirement (for example, when a packet loss rate that the terminal has on the source multicast transmission path is greater than or equal to a preset threshold).

The third request message may be used to request to switch from a multicast mode to a unicast mode to transmit target data. The target data is service data to be sent to the terminal, and the target data and the service data that is received by the terminal on the source multicast transmission path may belong to a same service.

Alternatively, the third request message may be used to request to switch from the source multicast transmission path to the target unicast transmission path for the target data. Because there is no unicast transmission path on the terminal in this case, the target unicast transmission path may be established by the first core network device in subsequent steps. The third request message may include an identifier of the source multicast transmission path. Alternatively, the third request message may include an identifier of the source multicast transmission path, and information about the receiving quality of the terminal on the source multicast transmission path.

Optionally, the third request message further includes an identifier of the first core network device. The identifier of the first core network device may be used by the AMF to determine the first core network device, to perform step 903.

The first core network device may be a control plane session management network element configured to manage the source multicast transmission path. For example, the first core network device may be an MBMS session management unit. When functions of the MBMS session management unit are integrated into an SMF, the first core network device may be the SMF.

903. The AMF sends the third request message to the first core network device.

Correspondingly, the first core network device receives the third request message from the AMF.

Before step 903, the AMF may determine the first core network device. For a determining method, refer to the description in step 704. Details are not described again.

904. The first core network device determines, based on the third request message, to switch the source multicast transmission path.

Specific an embodiment of an implementation of step 904 is similar to the manner in the embodiment shown in FIG. 6 in which the first core network device determines, based on the first request message, to switch the source multicast transmission path. For details, refer to the foregoing description. Details are not described again.

905. The first core network device sends an N4 session establishment/modification request message to the multicast user plane gateway.

Correspondingly, the multicast user plane gateway receives the N4 session establishment/modification request message from the first core network device. The multicast user plane gateway may be configured to transmit the service data carried on the source multicast transmission path.

The N4 session establishment/modification request message may be used to request to establish/modify an N4 session. The N4 session establishment/modification request message may include the identifier of the source multicast transmission path and an identifier of the target unicast transmission path.

The identifier of the target unicast transmission path may be generated or allocated by the first core network device. For example, the unicast transmission path may be a QoS flow. In this case, the identifier of the unicast transmission flow is an identifier of the QoS flow.

Before step 905, the method may further include: The first core network device selects the multicast user plane gateway as a user plane gateway used to transmit the service data carried on the target unicast transmission path. Compared with selecting a new user plane gateway as the user plane gateway used to transmit the service data carried on the target unicast transmission path, in the embodiment, signaling interaction between the new user plane gateway and the multicast user plane gateway can be avoided, and signaling overheads and a delay that is of user plane data transmission can be reduced.

After step 905, the method may further include: The multicast user plane gateway sends an N4 session establishment/modification response message to the first core network device. The N4 session establishment/modification response message may be used to indicate that the multicast user plane gateway successfully receives the N4 session establishment/modification request message.

906. The first core network device sends an SM request to the AMF.

Correspondingly, the AMF receives the SM request from the first core network device.

The SM request may include a PDU session establishment request message, an identifier of the terminal, the identifier of the source multicast transmission path, and the identifier of the target unicast transmission path. The PDU session establishment request message is used to request to establish a PDU session. The PDU session establishment request message may be an SM NAS message.

The identifier of the source multicast transmission path and the identifier of the target unicast transmission path may indicate to switch from the source multicast transmission path to the target unicast transmission path to transmit the target data.

907. The AMF sends an N2 PDU session request to a RAN node.

Correspondingly, the RAN node receives the N2 PDU session request from the AMF.

The N2 PDU session request may be used to request to establish an N2 PDU session. The N2 PDU session request may include SM NAS message (session management NAS message) (namely, a PDU session establishment request message), the identifier of the source multicast transmission path, and the identifier of the target unicast transmission path.

908. AN-specific resource configuration (AN-specific resource setup) is performed between the RAN node and the terminal.

The AN-specific resource configuration is used to allocate an air interface resource to the terminal, and the air interface resource is used for data transmission between the terminal and the RAN node.

In an embodiment of a specific implementation, step 908 may include: The RAN node sends the PDU session establishment request message, the identifier of the terminal, the identifier of the source multicast transmission path, and the identifier of the target unicast transmission path to the terminal, where the PDU session establishment request message includes the air interface resource allocated by the RAN node to the terminal. The terminal obtains the air interface resource allocated by the RAN node, and establishes a correspondence between the identifier of the source multicast transmission path and the identifier of the target unicast transmission path. The terminal sends a PDU session establishment accept message and the identifier that is of the terminal to the RAN node.

909. The RAN node sends an N2 PDU session request acknowledgment (N2 PDU session request ACK) to the AMF.

Correspondingly, the AMF receives the N2 PDU session request acknowledgment from the RAN node.

The N2 PDU session request acknowledgment may be used by the AMF to respond to the N2 PDU session request.

910. The AMF sends, to the first core network device, an SM response that carries N2 SM information (SM response with N2 SM info).

Correspondingly, the first core network device receives, from the AMF, the SM response that carries the N2 SM information.

The SM response may be used by the AMF to respond to the SM request.

After step 910, the target unicast transmission path of the terminal is established, and the multicast user plane gateway may transmit the target data on the target unicast transmission path.

According to the method provided in this embodiment, in a scenario in which there is no unicast transmission path on the terminal during the path switching, a core network device can still implement the path switching. Therefore, problems, of a long transmission path and a large transmission delay of signaling that are caused because a DN to which application layer control signaling needs to be transmitted for processing is outside a mobile communications network, can be avoided.

According to the method provided in the foregoing embodiments, the SMF, the UDM, the PCF, and the terminal may know whether the terminal has the unicast transmission path before the path switching. If the SMF, the UDM, the PCF, or the terminal determines, before the path switching, that the terminal has the unicast transmission path, the path switching is performed according to the method shown in FIG. 6, FIG. 7A and FIG. 7B, or FIG. 8A and FIG. 8B. If the SMF, the UDM, the PCF, or the terminal determines, before the path switching, that the terminal has no unicast transmission path, the path switching is performed according to the method shown in FIG. 9.

The foregoing mainly describes the solutions provided in the embodiments of this application from a perspective of the method. It may be understood that, to implement the foregoing functions, a communications apparatus (the communications apparatus may be the first core network device, the second core network device, the unicast user plane gateway, the multicast user plane gateway, the terminal, or the service server above) in the embodiments of this application includes a corresponding hardware structure and/or software module for performing each function. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in the embodiments of this application, module division is merely an example, and is merely a logical function division. In embodiments of actual implementation, other division manners may be used.

Figure 10:
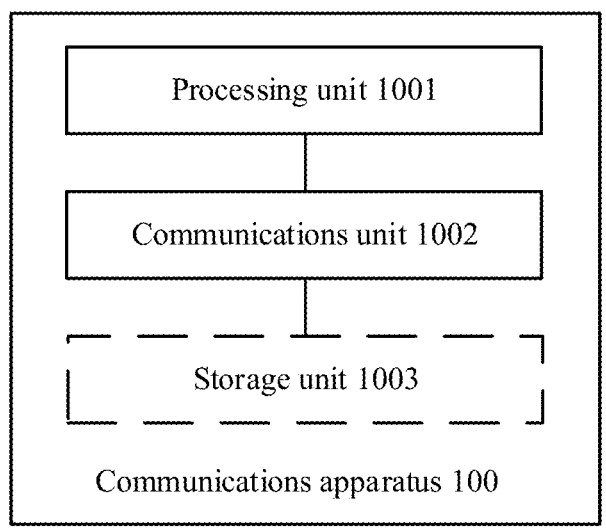
FIG. 10 is a schematic composition diagram of a communications apparatus according to an embodiment of this application.

Referring to FIG. 10, an embodiment of this application provides a communications apparatus 100. The communications apparatus 100 may be configured to perform actions of the first core network device in the foregoing method embodiments. The apparatus 100 may be the first core network device, for example, an MBMS session management unit or an SMF, or may be a chip or a system on chip on the first core network device. This is not limited. Specifically, the apparatus 100 may include a processing unit 1001 and a communications unit 1002. Optionally, the apparatus 100 may further include a storage unit 1003, configured to store program code and data of the first network device.

The communications unit 1002 is configured to receive a request message from a terminal, where the request message is used to request to switch from a multicast mode to a unicast mode to transmit service data to be sent to the terminal.

The processing unit 1001 is configured to indicate, based on the request message, a multicast user plane gateway and/or a service server corresponding to the terminal to send, to the terminal in the unicast mode, the service data to be sent to the terminal.

Optionally, the communications unit 1002 is further configured to send information about a unicast user plane gateway corresponding to the terminal to the multicast user plane gateway and/or the service server.

Optionally, the processing unit 1001 is specifically configured to send, based on the request message via the communications unit 1002, information about a unicast user plane gateway corresponding to the terminal to the multicast user plane gateway and/or the service server.

Optionally, the processing unit 1001 is further configured to obtain the information about the unicast user plane gateway based on the request message.

Optionally, the processing unit 1001 is specifically configured to: request the information about the unicast user plane gateway from a second core network device based on the request message via the communications unit 1002, and receive the information about the unicast user plane gateway from the second core network device.

Optionally, the request message includes an identifier of a unicast transmission path corresponding to the terminal.

Optionally, the request message includes an identifier of a multicast transmission path corresponding to the terminal. The communications unit 1002 is further configured to send, to the second core network device, the identifier of the unicast transmission path corresponding to the terminal, and the identifier of the multicast transmission path corresponding to the terminal. Alternatively, the communications unit 1002 is further configured to send the identifier of the unicast transmission path corresponding to the terminal, and information about the multicast user plane gateway to the second core network device, where the information about the multicast user plane gateway is a tunnel identifier of the multicast user plane gateway, or the information about the multicast user plane gateway is a user plane address and a port number of the multicast user plane gateway.

Optionally, the processing unit 1001 is specifically configured to: determine, based on the request message, a unicast transmission path corresponding to the terminal, and obtain the information about the unicast user plane gateway based on the unicast transmission path.

Optionally, the processing unit 1001 is specifically configured to: when the request message includes an identifier of the terminal, determine one QoS flow in at least one QoS flow corresponding to the identifier of the terminal as the unicast transmission path; when the request message includes an identifier of a PDU session of the terminal, determine one QoS flow in the at least one QoS flow corresponding to the identifier of the PDU session of the terminal as the unicast transmission path; or when the request message includes an identifier of a QoS flow, determine the QoS flow corresponding to the identifier of the QoS flow as the unicast transmission path.

Optionally, the processing unit 1001 is further configured to indicate the unicast user plane gateway to send, to the terminal on the unicast transmission path, the received service data to be sent to the terminal.

Optionally, the request message includes an identifier of a multicast transmission path corresponding to the terminal. The processing unit 1001 is specifically configured to: send an identifier of the unicast transmission path and the identifier of the multicast transmission path to the unicast user plane gateway via the communications unit 1002; or send an identifier of the unicast transmission path and information about the multicast user plane gateway to the unicast user plane gateway via the communications unit 1002, where the information about the multicast user plane gateway is a tunnel identifier of the multicast user plane gateway, or the information about the multicast user plane gateway is a user plane address and a port number of the multicast user plane gateway.

Optionally, the communications unit 1002 is further configured to send a response message of the request message to the terminal, where the response message includes the identifier of the unicast transmission path.

Referring to FIG. 10, an embodiment of this application provides another communications apparatus 100. The communications apparatus 100 may be configured to perform actions of the second core network device in the foregoing method embodiments. The apparatus 100 may be the second core network device, for example, an SMF, or may be a chip or a system on chip on the second core network device. This is not limited. Specifically, the apparatus 100 may include a processing unit 1001 and a communications unit 1002. Optionally, the apparatus 100 may further include a storage unit 1003, configured to store program code and data of the second network device.

The communications unit 1002 is configured to receive a request message from a first core network device, where the request message is used to request information about a unicast user plane gateway corresponding to a terminal.

The processing unit 1001 is configured to send the information about the unicast user plane gateway to the first core network device based on the request message via the communications unit 1002.

Optionally, the request message includes an identifier of a unicast transmission path corresponding to the terminal, and the processing unit 1001 is further configured to indicate the unicast user plane gateway to send, to the terminal on the unicast transmission path, received service data to be sent to the terminal, where the received service data to be sent to the terminal is originally sent on a multicast transmission path corresponding to the terminal, and switching is performed from the multicast transmission path corresponding to the terminal to the unicast transmission.

Optionally, the request message further includes an identifier of the multicast transmission path, and the communications unit 1002 is further configured to send the identifier of the unicast transmission path and the identifier of the multicast transmission path to the unicast user plane gateway.

Optionally, the request message further includes information about a multicast user plane gateway corresponding to the terminal, where the information about the multicast user plane gateway is a tunnel identifier of the multicast user plane gateway, or the information about the multicast user plane gateway is a user plane address and a port number of the multicast user plane gateway, and the communications unit 1002 is further configured to send the identifier of the unicast transmission path and the information about the multicast user plane gateway to the unicast user plane gateway.

Optionally, the communications unit 1002 is further configured to: receive the identifier of the unicast transmission path and an identifier of the multicast transmission path from the first core network device, and send the identifier of the unicast transmission path and the identifier of the multicast transmission path to the unicast user plane gateway. Alternatively, the communications unit 1002 is further configured to: receive, from the first core network device, the identifier of the unicast transmission path and information about a multicast user plane gateway corresponding to the terminal, and send the identifier of the unicast transmission path and the information about the multicast user plane gateway to the unicast user plane gateway, where the information about the multicast user plane gateway is a tunnel identifier of the multicast user plane gateway, or the information about the multicast user plane gateway is a user plane address and a port number of the multicast user plane gateway.

Referring to FIG. 10, an embodiment of this application provides another communications apparatus 100. The communications apparatus 100 may be configured to perform actions of the terminal in the foregoing method embodiments. The apparatus 100 may be a terminal, or may be a chip or a system on chip on the terminal. This is not limited. Specifically, the apparatus 100 may include a processing unit 1001 and a communications unit 1002. Optionally, the apparatus 100 may further include a storage unit 1003, configured to store program code and data of the terminal.

The processing unit 1001 is configured to send a request message to a first core network device via the communications unit 1002, where the request message is used to request to switch from a multicast mode to a unicast mode to transmit service data to be sent to the terminal.

The processing unit 1001 is further configured to receive a response message of the request message from the first core network device via the communications unit 1002.

Optionally, the request message includes an identifier of a multicast transmission path corresponding to the terminal.

Optionally, the request message further includes an identifier of the terminal, an identifier of a PDU session of the terminal, or an identifier of a QoS flow of the terminal.

Optionally, the response message includes an identifier of a unicast transmission path corresponding to the terminal.

Referring to FIG. 10, an embodiment of this application provides another communications apparatus 100. The communications apparatus 100 may be configured to perform actions of the unicast user plane gateway in the foregoing method embodiments. The apparatus 100 may be the unicast user plane gateway, for example, a UPF, or may be a chip or a system on chip on the unicast user plane gateway. This is not limited. Specifically, the apparatus 100 may include a processing unit 1001 and a communications unit 1002. Optionally, the apparatus 100 may further include a storage unit 1003, configured to store program code and data of the unicast user plane gateway.

The communications unit 1002 is configured to receive an indication used to indicate to send, to a terminal on a unicast transmission path, received service data to be sent to the terminal, where the received service data to be sent to the terminal is originally sent on a multicast transmission path corresponding to the terminal, and switching is performed from the multicast transmission path corresponding to the terminal to the unicast transmission path corresponding to the terminal.

The communications unit 1002 is further configured to receive the service data to be sent to the terminal.

The processing unit 1001 is configured to send, based on the indication via the communications unit 1002 on the unicast transmission path to the terminal, the service data to be sent to the terminal.

Optionally, the communications unit 1002 is further configured to receive an identifier of the unicast transmission path and an identifier of the multicast transmission path. Alternatively, the communications unit 1002 is further configured to receive the identifier of the unicast transmission path and information about a multicast user plane gateway, where the information about the multicast user plane gateway is a tunnel identifier of the multicast user plane gateway, or the information about the multicast user plane gateway is a user plane address and a port number of the multicast user plane gateway.

Optionally, the processing unit 1001 is further configured to determine the unicast transmission path according to the identifier of the unicast transmission path.

Optionally, the processing unit 1001 is further configured to determine, based on the identifier of the multicast transmission path or the information about the multicast user plane gateway, the service data to be sent to the terminal.

Referring to FIG. 10, an embodiment of this application provides another communications apparatus 100. The communications apparatus 100 may be configured to perform actions of the multicast user plane gateway in the foregoing method embodiments. The apparatus 100 may be the multicast user plane gateway, for example, a UPF, or may be a chip or a system on chip on the multicast user plane gateway. This is not limited. Specifically, the apparatus 100 may include a processing unit 1001 and a communications unit 1002. Optionally, the apparatus 100 may further include a storage unit 1003, configured to store program code and data of the multicast user plane gateway.

The communications unit 1002 is configured to receive indication information from a first core network device. The indication information is used to indicate to send, to a terminal in a unicast mode, service data to be sent to the terminal, where the service data to be sent to the terminal is originally sent on a multicast transmission path corresponding to the terminal, and switching is performed from the multicast transmission path corresponding to the terminal to a unicast transmission path corresponding to the terminal.

The processing unit 1001 is configured to send, based on the indication information via the communications unit 1002 to a unicast user plane gateway corresponding to the terminal, the service data that is received from a service server and that is to be sent to the terminal.

Optionally, the communications unit 1002 is further configured to receive information about the unicast user plane gateway from the first core network device.

Optionally, the processing unit 1001 is further configured to determine the unicast user plane gateway based on the information about the unicast user plane gateway.

Referring to FIG. 10, an embodiment of this application provides another communications apparatus 100. The communications apparatus 100 may be configured to perform actions of the service server in the foregoing method embodiments. The apparatus 100 may be the service server, or may be a chip or a system on chip on the service server. This is not limited. Specifically, the apparatus 100 may include a processing unit 1001 and a communications unit 1002. Optionally, the apparatus 100 may further include a storage unit 1003, configured to store program code and data of the service server.

The communications unit 1002 is configured to receive indication information from a first core network device. The indication information is used to indicate to send, to a terminal in a unicast mode, service data to be sent to the terminal, where the service data to be sent to the terminal is originally sent on a multicast transmission path corresponding to the terminal, and switching is performed from the multicast transmission path corresponding to the terminal to a unicast transmission path corresponding to the terminal.

The processing unit 1001 is configured to send, based on the indication information via the communications unit 1002 to a unicast user plane gateway corresponding to the terminal, the service data to be sent to the terminal.

Optionally, the communications unit 1002 is further configured to receive information about the unicast user plane gateway from the first core network device.

Optionally, the processing unit 1001 is further configured to determine the unicast user plane gateway based on the information about the unicast user plane gateway.

In the foregoing embodiments, the processing unit 1001 may be a processor or a controller, and the communications unit 1002 may be a communications interface, a transceiver, a transceiver circuit, or the like. The communications interface is a general term, and may include one or more interfaces. The storage unit 1003 may be a memory. When the processing unit 1001 is the processor, the communications unit 1002 is the communications interface, and the storage unit 1003 is the memory, the communications apparatus 100 in this embodiment of this application may be the communications apparatus shown in FIG. 2.

An embodiment of this application further provides a computer-readable storage medium, including an instruction. When the instruction is run on a computer, the computer performs actions of the first core network device, the second core network device, the unicast user plane gateway, the multicast user plane gateway, the terminal, or the service server in the foregoing method embodiments.

An embodiment of this application further provides a computer program product including an instruction. When the computer program product runs on a computer, the computer performs actions of the first core network device, the second core network device, the unicast user plane gateway, the multicast user plane gateway, the terminal, or the service server in the foregoing method embodiments.

An embodiment of this application further provides a communications system, including the first core network device and the terminal in the foregoing embodiments, and further including a multicast user plane gateway and/or a service server.

Optionally, the system further includes the foregoing second core network device. Reference may be made to the embodiment shown in FIG. 7A and FIG. 7B or FIG. 8A and FIG. 8B.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, the disclosed content, and the accompanying claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and the accompanying drawings are merely example description of this application defined by the accompanying claims, and are considered as any of or all modifications, variations, combinations or equivalents that cover the scope of this application. It is clear that a person skilled in the art can make various modifications and variations to this application without departing from the spirit and scope of this application. If these modifications and variations of this application fall within the scope of the claims of this application and their equivalent technologies, this application is also intended to cover these modifications and variations.

What is claimed is:

1. A communication method, comprising:
   receiving, by a multicast user plane gateway, first indication information from a first core network device, wherein the first indication information is generated by the first core network device and indicates to switch from sending of a target data to a terminal in a multicast mode to sending the target data to the terminal in a unicast mode, and the first core network device is a multimedia broadcast/multicast service session management unit; and
   sending, by the multicast user plane gateway, (i) the target data to a unicast user plane gateway corresponding to the terminal based on the first indication information, and (ii) the target data in a multicast mode on a source multicast transmission path to a terminal group to which the terminal belongs, wherein the target data is sent to the terminal via the unicast user plane gateway, and the sending further comprises: replicating, by the multicast user plane gateway, the target data to obtain two pieces of data,
   sending, by the multicast user plane gateway to the terminal group, a first piece of data from the two pieces of data in the multicast mode on the source multicast transmission path, and
sending, by the multicast user plane gateway to the terminal, a second piece of data from the two pieces of data on a target unicast transmission path corresponding to the terminal; and
   wherein the method further comprises receiving, by the multicast user plane gateway from the first core network device, information about the unicast user plane gateway, wherein the information about the unicast user plane gateway comprises a tunnel identifier of the unicast user plane gateway.

2. The method according to claim 1, further comprising: determining, by the multicast user plane gateway based on the information about the unicast user plane gateway, the unicast user plane gateway.

3. The communication method according to claim 1, further comprising:
   receiving, by the unicast user plane gateway from a second core network device, second indication information indicating to send the target data received from the multicast user plane gateway to the terminal on the target unicast transmission path, wherein the second core network device is a control plane session management network element that manages the target unicast transmission path and initiates a switch from transmission of the target data from a multicast mode to a unicast mode via the target unicast transmission path;
   receiving, by the unicast user plane gateway, the target data; and
sending, by the unicast user plane gateway, the target data to the terminal on the target unicast transmission path based on the second indication information.

4. The method according to claim 3, further comprising:
   receiving, by the unicast user plane gateway from the second core network device, an identifier of the target unicast transmission path and an identifier of a source multicast transmission path;
   determining, by the unicast user plane gateway, the target unicast transmission path based on the identifier of the target unicast transmission path; and
   determining, by the unicast user plane gateway, the target data based on the identifier of the source multicast transmission path.

5. The method according to claim 1, wherein the information about the unicast user plane gateway and the first indication information is carried in a single message.

6. The method according to claim 1, wherein the first indication information comprises information about the unicast user plane gateway, and wherein the first indication information is used for determining the unicast user plane gateway.

7. A communications apparatus, comprising:
   a processor; and a memory storing executable instructions, which when executed by the processor, cause the processor to performing operations comprising:
   receiving first indication information from a first core network device, wherein the first indication information is generated by the first core network device and indicates to switch from sending of a target data to a terminal in a multicast mode to sending the target data to the terminal in a unicast mode, and the first core network device is a multimedia broadcast/multicast service session management unit, and
   sending (i) the target data to a unicast user plane gateway corresponding to the terminal based on the first indication information, and (ii) the target data in a multicast mode on a source multicast transmission path to a terminal group to which the terminal belongs, wherein the target data is sent to the terminal via the unicast user plane gateway, and the operations to send further comprise operation to:
   replicate, by the communications apparatus, the target data to obtain two pieces of data,
   send, by the communications apparatus to the terminal group, a first piece of data from the two pieces of data in the multicast mode on the source multicast transmission path, and send, by the communications apparatus to the terminal, a second piece of data from the two pieces of data on a target unicast transmission path corresponding to the terminal; and wherein operations further comprise receiving, by the communications apparatus from the first core network device, information about the unicast user plane gateway, wherein the information about the unicast user plane gateway comprises a tunnel identifier of the unicast user plane gateway.

8. The communications apparatus according to claim 7, wherein the processor is further configured to:
determine, based on the information about the unicast user plane gateway, the unicast user plane gateway.

9. The communications apparatus according to claim 7, wherein the information about the unicast user plane gateway and the first indication information is carried in a single message.

10. The communications apparatus according to claim 7, wherein the first indication information comprises information about the unicast user plane gateway, and wherein the first indication information is used for determining the unicast user plane gateway.

11. A communications system, comprising:
a first core network device is configured to generate a first indication information and send the first indication information to a multicast user plane gateway, wherein the first indication information indicates to switch from sending of a target data to a terminal in a multicast mode to sending the target data to the terminal in a unicast mode, and the first core network device is a multimedia broadcast/multicast service session management unit;

the multicast user plane gateway is configured to receive the first indication information, and send (i) the target data to a unicast user plane gateway corresponding to the terminal based on the first indication information, and (ii) the target data in a multicast mode on a source multicast transmission path to a terminal group including the terminal, wherein the target data is sent to the terminal via the unicast user plane gateway, and operations to send further comprise one or more operation to:
replicate, by the multicast user plane gateway, the target data to obtain two pieces of data,
send, by the multicast user plane gateway to the terminal group, a first piece of data from the two pieces of data in the multicast mode on the source multicast transmission path, and
send, by the multicast user plane gateway to the terminal, a second piece of data from the two pieces of data on a target unicast transmission path corresponding to the terminal; and wherein the multicast user plane gateway is further configured to receive, from the first core network device, information about the unicast user plane gateway, wherein the information about the unicast user plane gateway comprises a tunnel identifier of the unicast user plane gateway.

12. The communications system according to claim 11, further comprising:
the unicast user plane gateway configured to:
receive from a second core network device, second indication information indicating to send the target data received from the multicast user plane gateway to the terminal on the target unicast transmission path, wherein the second core network device is a control plane session management network element that manages the target unicast transmission path and initiates a switch from transmission of the target data from a multicast mode to a unicast mode via the target unicast transmission path, receive the target data, and
send the target data to the terminal on the target unicast transmission path based on the second indication information.

13. A non-transitory computer readable storage medium comprising instructions which, when executed by one or more processors for providing system configurations, cause the one or more processors to perform operations comprising:
receiving first indication information from a first core network device, wherein the first indication information is generated by the first core network device and indicates to switch from sending of a target data to a terminal in a multicast mode to sending the target data to the terminal in a unicast mode, and the first core network device is a multimedia broadcast/multicast service session management unit, and
sending (i) the target data to a unicast user plane gateway corresponding to the terminal based on the first indication information, and (ii) the target data in a multicast mode on a source multicast transmission path to a terminal group to which the terminal belongs, wherein the target data is sent to the terminal via the unicast user plane gateway, and the operations to send further comprise operation to:
replicate the target data to obtain two pieces of data,
send, to the terminal group, a first piece of data from the two pieces of data in the multicast mode on the source multicast transmission path, and send, to the terminal, a second piece of data from the two pieces of data on a target unicast transmission path corresponding to the terminal; and
wherein the one or more processors are further caused to perform operations comprising: receiving, from the first core network device, information about a unicast user plane gateway, wherein the information about the unicast user plane gateway comprises a tunnel identifier of the unicast user plane gateway.

* * * * *

UNITED STATES PATENT AND TRADEMARK OFFICE
CERTIFICATE OF CORRECTION

| | | |
|---|---|---|
| PATENT NO. | : 11,917,498 B2 | Page 1 of 1 |
| APPLICATION NO. | : 17/132423 | |
| DATED | : February 27, 2024 | |
| INVENTOR(S) | : Cuili Ge and Yanmei Yang | |

It is certified that error appears in the above-identified patent and that said Letters Patent is hereby corrected as shown below:

In the Claims

In Claim 1, Column 43, Line 39, delete "to switch from sending of a target data" and insert --to send a target data--.

Signed and Sealed this
Seventh Day of May, 2024

Katherine Kelly Vidal
*Director of the United States Patent and Trademark Office*